United States Patent
Olson et al.

(10) Patent No.: US 8,876,011 B2
(45) Date of Patent: Nov. 4, 2014

(54) PAYMENT CARD AND METHODS

(71) Applicant: Protean Payment, Inc., Ann Arbor, MI (US)

(72) Inventors: Thiago Olson, Ann Arbor, MI (US); Chris Bartenstein, Ann Arbor, MI (US)

(73) Assignee: Protean Payment, Inc., Ann Arbor, MI (US)

(*) Notice: Subject to any disclaimer, the term of this patent is extended or adjusted under 35 U.S.C. 154(b) by 0 days.

(21) Appl. No.: 14/168,681

(22) Filed: Jan. 30, 2014

(65) Prior Publication Data

US 2014/0144984 A1 May 29, 2014

Related U.S. Application Data

(63) Continuation of application No. 13/904,939, filed on May 29, 2013.

(60) Provisional application No. 61/796,594, filed on Nov. 15, 2012, provisional application No. 61/848,581, filed on Jan. 7, 2013, provisional application No. 61/849,213, filed on Jan. 22, 2013, provisional application No. 61/850,866, filed on Feb. 25, 2013, provisional application No. 61/818,831, filed on May 2, 2013, provisional application No. 61/689,083, filed on May 29, 2012.

(51) Int. Cl.
*G06K 19/06* (2006.01)
*G06Q 20/34* (2012.01)
*G07F 7/08* (2006.01)

(52) U.S. Cl.
CPC ...... *G06K 19/06206* (2013.01); *G06Q 20/3415* (2013.01); *G06Q 20/3572* (2013.01); *G07F 7/0833* (2013.01); *G07F 7/0853* (2013.01); *G06Q 20/341* (2013.01)
USPC .............................. 235/492; 235/487; 235/488

(58) Field of Classification Search
USPC ................. 235/487, 492, 488; 340/10.1, 10.2, 340/572.1–572.9
See application file for complete search history.

(56) References Cited

U.S. PATENT DOCUMENTS 6,592,044 B1 7/2003 Wong et al.
6,595,342 B1 * 7/2003 Maritzen et al. ............. 194/212
(Continued)

FOREIGN PATENT DOCUMENTS

WO 2009082760 A 7/2009

OTHER PUBLICATIONS

BWOne. Credit Card 2.0 Powered Cards by Dynamics, Inc. at CES Unveiled NYC 2010—BWOne.com. Nov. 2010. [retrieved on Oct. 11, 2013] Retrieved from the internet: <http://www.youtube.com/watch?v=IVuUCbkYNxA>.

*Primary Examiner* — Michael G Lee
*Assistant Examiner* — Tabitha Chedekel
(74) *Attorney, Agent, or Firm* — Jeffrey Schox; Peter Miller

(57) ABSTRACT

One variation of a method for controlling a payment card (including a magnetic stripe emulator, a processor, and an input region) includes: establishing a wireless connection with a mobile computing device; receiving, over the wireless connection, a first magnetic sequence command corresponding to a first payment method and a second magnetic sequence command corresponding to a second payment method; initiating a payment mode comprising a disable trigger; in response to selection of the first payment method through the input region, arming the processor to drive the magnetic stripe emulator according to the first magnetic sequence command in the payment mode; in the payment mode, dismissing selection of the second payment method through the input region; and in response to instance of the disable trigger, disabling operation of the magnetic stripe emulator.

20 Claims, 13 Drawing Sheets

(56) References Cited

U.S. PATENT DOCUMENTS

| | | |
|---|---|---|
| 7,097,108 B2 | 8/2006 | Zellner et al. |
| 7,127,236 B2 | 10/2006 | Khan et al. |
| 7,246,752 B2 | 7/2007 | Brown |
| 7,380,710 B2 | 6/2008 | Brown |
| 7,472,829 B2 | 1/2009 | Brown |
| 7,543,739 B2 | 6/2009 | Brown et al. |
| 7,552,869 B1 | 6/2009 | Ramachandran |
| 7,578,437 B2 | 8/2009 | Lu et al. |
| 7,580,898 B2 | 8/2009 | Brown et al. |
| 7,584,153 B2 | 9/2009 | Brown et al. |
| 7,621,458 B2 | 11/2009 | Zellner et al. |
| 7,631,804 B2 | 12/2009 | Brown |
| 7,641,124 B2 | 1/2010 | Brown et al. |
| 7,690,580 B2 * | 4/2010 | Shoemaker .................. 235/493 |
| 7,784,687 B2 | 8/2010 | Mullen et al. |
| 7,793,851 B2 | 9/2010 | Mullen |
| 7,815,114 B2 * | 10/2010 | Mesaros ....................... 235/383 |
| 7,823,794 B2 | 11/2010 | Li et al. |
| 7,828,220 B2 | 11/2010 | Mullen |
| 7,931,195 B2 | 4/2011 | Mullen |
| 7,954,705 B2 | 6/2011 | Mullen |
| 7,954,708 B2 | 6/2011 | Blossom |
| 7,954,724 B2 | 6/2011 | Poidomani et al. |
| 8,011,577 B2 | 9/2011 | Mullen et al. |
| 8,015,592 B2 * | 9/2011 | Doughty et al. .................. 726/2 |
| 8,020,775 B2 | 9/2011 | Mullen et al. |
| 8,066,191 B1 | 11/2011 | Cloutier et al. |
| 8,074,877 B2 | 12/2011 | Mullen et al. |
| 8,104,679 B2 | 1/2012 | Brown |
| 8,172,148 B1 | 5/2012 | Cloutier et al. |
| 8,201,747 B2 | 6/2012 | Brown et al. |
| 8,231,063 B2 | 7/2012 | Poidomani et al. |
| 8,267,327 B2 | 9/2012 | Tsao et al. |
| 8,282,007 B1 | 10/2012 | Cloutier et al. |
| 8,286,876 B2 | 10/2012 | Mullen et al. |
| 8,302,872 B2 | 11/2012 | Mullen |
| 8,660,948 B2 * | 2/2014 | Dessert et al. .................. 705/40 |
| 2009/0159688 A1 | 6/2009 | Mullen et al. |
| 2011/0167375 A1 | 7/2011 | Kocienda |
| 2011/0218911 A1 | 9/2011 | Spodak |
| 2012/0052800 A1 | 3/2012 | Bona et al. |
| 2013/0103537 A1 | 4/2013 | Hewett |

* cited by examiner

PAYMENT CARD AND METHODS

CROSS-REFERENCE TO RELATED APPLICATIONS

This application is a continuation application of U.S. patent application Ser. No. 13/904,939, filed on 29 May 2013, which claims the benefit of U.S. Provisional Application No. 61/689,083 filed on 29 May 2012, U.S. Provisional Application No. 61/796,594, filed on 15 Nov. 2012, U.S. Provisional Application No. 61/848,581 filed on 7 Jan. 2013, U.S. Provisional Application No. 61/849,213 filed on 22 Jan. 2013, U.S. Provisional Application No. 61/850,866, filed on 25 Feb. 2013, and U.S. Provisional Application No. 61/818,831, filed on 2 May 2013, all of which are incorporated herein in their entireties by this reference.

TECHNICAL FIELD

This invention relates generally to the field of bank cards and, more specifically, to a new and useful payment card and associated methods in the field of bank cards.

DESCRIPTION OF THE EMBODIMENTS

The following description of the embodiments of the invention is not intended to limit the invention to these embodiments, but rather to enable any person skilled in the art to make and use this invention.

1. Payment Card

Figure 1:
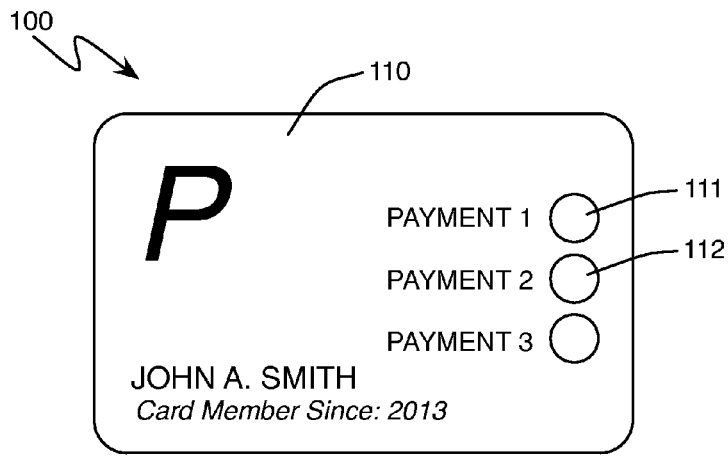
FIG. 1 is a schematic representation of a payment card.
Figure 2A:
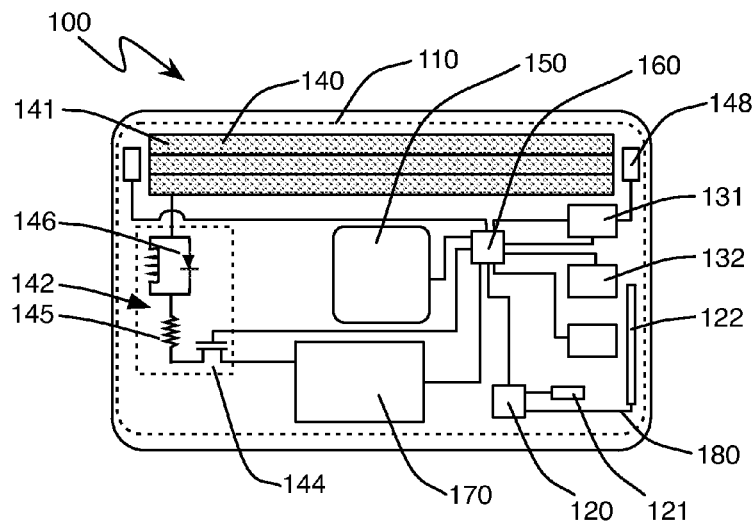
FIGS. 2A and 2B are schematic representations of the payment card.

As shown in FIGS. 1 and 2A, a payment card includes: a sheet 110 comprising a first icon 111 and a second icon 112; a transducer 150 arranged within the sheet 110 and configured to output a voltage in response to an impulse on a surface of the sheet 110; a wireless communication module 120; a first input region 131 adjacent the first icon 111; a second input region 132 adjacent the second icon 112; a magnetic stripe emulator 140; and a processor 160 arranged within the sheet 110 and configured to transition from a passive state to an active state in response to receiving a voltage output from the transducer 150, to receive a first magnetic sequence command associated with a first payment method and a second magnetic sequence command associated with a second payment method through the wireless communication module 120, to assign the first payment method to the first input region 131 and the second payment method to the second input region 132, to receive a selection for the second payment method from the second input region 132 in response to an input adjacent the second icon 112, and to control the magnetic stripe emulator 140 according to the second magnetic sequence command in response to receiving the selection for the second payment method.

Generally, the payment card 100 functions to consolidate multiple plastic payment cards into a single physical card that can imitate payment functionalities of the multiple plastic payment cards through manipulation of a magnetic stripe emulator. For example, the payment card 100 can imitate a user's debit card issued through a bank, a user's primary credit card issued by a preferred credit card company, and a user's secondary credit card issued by another credit card company by selectively driving the magnetic stripe emulator 140 according to a unique magnetic sequence command associated with each individual card. The payment card 100 can additionally or alternatively imitate a gift card, an identification (i.e., ID) card (e.g., a driver's license), a loyalty card, a door or gate access card, or any other individual card containing data in a magnetic stripe. The payment card 100 can define a form factor substantially similar to that of a standard plastic payment card, that is, 3.370" (85.60 mm) wide by 2.125" (53.98 mm) tall by 0.06" thick.

The payment card 100 can also interface with a mobile computing device, via the wireless communication module 120, to authenticate an upcoming payment attempt, to download magnetic sequence commands of a subset of available payment methods, and/or to upload a current payment selection for display on the mobile computing device. For example, the mobile computing device can be a smartphone or tablet, and a native application executing on the smartphone or tablet can manage entry of new plastic bank cards, selection of magnetic sequence commands to upload to the payment card 100, and authentication of upcoming payments. The payment card 100 can also include the set of input regions to enable a user to select a particular payment method to imitate, to enter a passcode to authenticate an upcoming payment attempt, and/or to select a particular operating mode of the payment card 100, such as a timed payment mode (described below). Therefore, the payment card 100 can—separately or in conjunction with a native application executing on a mobile computing device—consolidate multiple plastic bank cards into a single dynamic payment card of a similar form factor, thereby substantially eliminating a need for a user to carry multiple (i.e., more than one) bank cards, gift cards, and/or identification cards, etc. at any given time.

The sheet 110 of the payment card 100 includes a first icon and a second icon. Generally, the sheet 110 functions as a housing for the various components of the payment card 100, including the transducer 150, the wireless communication module 120, the input regions, the processor 160, etc. The sheet 110 can therefore define the external dimensions of the payment card 100, and the sheet 110 can therefore be of a form factor substantially similar to that of a standard plastic bank card. In one implementation, the sheet 110 includes a front layer 116 and a back layer 117 that sandwiches various components of the payment card 100. For example, the transducer 150, the wireless communication module 120, the input regions, the processor 160, and a battery can be mounted or constructed on a flexible circuit board 180 (shown in FIG. 2A) that is sandwiched between the front layer 116 and the back layer 117 to define an external geometry that is 3.370" (85.60 mm) wide by 2.125" (53.98 mm) tall by 0.06" thick. Alternatively, the flexible circuit board 180 can be reaction injection molded between (or inside) the front layer 116 and the back layer 117, and a glass card layer can be laminated over the front layer. However, the sheet 10 can be assembled in any other suitable way. The sheet 110 can also define a fluid-tight or dustproof housing that can seal any of the foregoing components against contamination by fluid or particulate ingress.

The sheet 110 also defines the first icon 111 and the second icon 112 that are visually and/or tactilely distinguishable by a user. In one example, as in the foregoing implementation, the first icon 111 and the second icon 112 can be printed on the front layer 116. In this example, the front layer 116 can be transparent or translucent, and the first and second icons can be printed on an interior surface of the front layer 116 to protect the first and second icons from wear. In another example, the first icon 111 and the second icon 112 can be embossed or debossed on the front layer 116, such as through stamping, molding, etching, or bulk micromachining.

The first icon 111 and the second icon 112 can include alphanumeric text. For example, the first icon 111 can include a printed, embossed, and/or debossed "A", and the second icon 112 can include a printed, embossed, and/or debossed "B". In a similar example, the first icon 111 can include a printed, embossed, and/or debossed "1", and the second icon 112 can include a printed, embossed, and/or debossed "2". The sheet 110 can also define additional icons, such as a third icon including a printed, embossed, and/or debossed "C" or 3", a fourth icon including a printed, embossed, and/or debossed "D" or 4", etc. aligned with a third input region and/or a fourth input, etc. Alternatively, the first icon 111 and the second icon 112 can include descriptions or other symbols. For example, The sheet 110 can define the first icon 111 that reads "Credit," the second icon 112 that reads "Debit," a third icon that reads "Gift," and a fourth icon that reads "Driver's License." However, the sheet 110 can define the first icon 111, the second icon 112, etc. that are of any other form and printed or formed on the sheet 110 in any other suitable way.

As described above, the sheet 110 can includes two (or more) layers that house or "sandwich" various components of the payment card 100. Each of the two layers can be of the same or similar material, such as polyvinyl chloride (PVC), polyethylene terephthalate (PETG), or another polymer or silicone-based elastomer. Alternatively, the layers can be of disparate materials. For example, the sheet 110 can include a front layer 116 of chemically-strengthened alkali-aluminosilicate glass and a back layer 117 of polyurethane. The assembly of layers (i.e., the sheet 110) can also be flexible to approximate the "feel" of a standard PETG or PVC plastic bank card. The layers can be assembled with an adhesive, through hot or cold lamination, through surface activation, or by any other suitable process or technique. However, the sheet 110 can include any other materials, can define the first icon 111 and the second icon 112 in any other way, can be of any other form or geometry, and can feature any other mechanical property.

The transducer 150 of the payment card 100 is arranged within the sheet 110 and is configured to generate a voltage output in response to an impulse on a surface of the sheet 110. Generally, the transducer 150 functions to convert a mechanical impulse (e.g., a tap) on a surface of the payment card 100 into an electrical signal of magnitude sufficient to 'wake' the processor 160 from a passive mode to an active mode. For example, the transducer 150 can be piezoelectric transducer electrically coupled to an 'wake' interrupt-enabled input pin of the processor 160, wherein the transducer 150 outputs a voltage greater than 2.5V, which triggers the processor 160 to switch from a passive, low-current draw mode to an active, higher-current draw mode.

In the implementation in which the sheet 110 includes two layers, the transducer 150 can be arranged between the two layers, such as on the flexible circuit board 180 housed between the two layers. The transducer 150 can therefore be fabricated or installed across an inner broad face of one layer of the sheet 110, such as across a portion of the inner broad face of the back layer 117 of the sheet 110. The transducer 150 can also be aligned with a region of the sheet 110 that is substantially tactilely accessible to a user when the payment card 100 is held. For example, the form factor of the payment card 100 can be such that a user instinctively grasps the top and bottom long edges of the card between the thumb and the index and middle fingers of one hand and taps the card near the center of its broad face with the index finger of the other hand to wake the card from the passive setting. In this example, the transducer 150 can be arranged near the center of the broad face of the card.

Furthermore, the transducer 150 can be arranged proximal a portion of the payment card 100 likely to exhibit substantial deflection in response to a typical impulse. The transducer 150 may output a voltage potential proportional to its deflection, and the transducer 150 may therefore be arranged proximal a region of the sheet 110 that exhibits maximum deflection under impact. In one example implementation in which the payment card 100 is of a form factor similar to that of a standard plastic bank card, when a user grasps the top and bottom long edges of the card between the thumb and the index and middle fingers of one hand and taps the card near the center of its broad face with the index finger of the other hand, the sheet 110 may exhibit maximum deformation along a line substantially parallel to and equidistant from the long edges of the sheet 110. In a similar example implementation, when the user grasps the left and right short edges of the card between the thumb and the index and middle fingers of one hand and taps the card near the center of its broad face with the index finger of the other hand, the sheet 110 may exhibit maximum deformation along a line substantially parallel to and equidistant from the short edges of the sheet 110. Therefore, the transducer 150 can be substantially aligned with the center of the broad face of the sheet 110 to substantially ensure that an impact (e.g., tap) on the payment card 100 will yield a voltage spike, from the transducer 150, of a magnitude sufficient to wake the processor 160 from the passive setting to the active setting substantially regardless of how the card is held by the user. However, the transducer 150 can be any other type of transducer arranged in any other way within the payment card 100.

The wireless communication module 120 of the payment card 100 functions to establish a wireless connection with a mobile computing device (e.g., a smartphone, a tablet, or any other external device) to enable wireless data transfer to the payment card 100. Generally, the wireless communication module 120 can enable communications between the payment card 100 and the mobile computing device to download payment method data (e.g., magnetic sequence commands for various payment methods) and to authenticate use of the payment card 100 to complete a transaction, as described below. The wireless communication module 120 can include both a wireless receiver and a wireless transmitter that enable two-way communication between the payment card 100 and the mobile computing device. For example, the wireless communication module 120 includes a short-range wireless transceiver, such as a Bluetooth communication module. However, the wireless communication module 120 can implement any other suitable type of wireless communication protocol, such as Wi-Fi, cellular, or ZigBee.

The wireless communication module 120 can be fabricated or installed on the flexible circuit board 180 and can include a radio antenna 122 tailored to a particular wireless communication frequency. For example, the wireless communication module 120 can include a Bluetooth transceiver configured to exchange data wirelessly in the industrial, scientific and medical (ISM) radio bands between 2400 and 2480 MHz, and the radio antenna 122 can be sized for the frequency band between 2400 and 2480 MHz. The radio antenna 122 can be integrated into the flexible circuit board 180 as a trace and can include a linear segment. Because the payment card 100 may flex, such as under an impact to wake to processor or to mimic a standard plastic bank card as described above, the linear segment of the radio antenna 122 may deform, thereby affecting an effective length of the antenna. Therefore, the linear segment can be arranged proximal a region of the sheet 110 subject to minimal relative deflection, such as adjacent and parallel to a short edge of the sheet 110 (i.e., perpendicular to a long edge of the sheet 110). The wireless communication module 120 can also include a crystal oscillator installed or fabricated on the flexible circuit board 180. Flexure of the sheet 110 can induce strain across the crystal oscillator, thereby modifying a clock speed of the crystal oscillator 121. For example, strain across the crystal oscillator 121 can reduce the clock speed of the crystal oscillator 121 from 2400 MHZ to 2390, which falls outside of the ISM range suitable for Bluetooth communication. Therefore, the crystal oscillator 121 can be arranged proximal a region of the sheet 110 subject to minimal relative deflection, such as adjacent (and parallel) to a short edge of the sheet 110. However, the wireless communication module 120 can include any other type of antenna or oscillator arranged in any other way.

In one alternative implementation, the wireless communication module 120 can include an optical sensor, such as a photoresistor or photodiode, to enable optical transmission of data from the mobile computing device to the payment card 100. For example, to upload a magnetic sequence command for a payment method to the payment card 100, a user can place the payment card 100 over a screen of a smartphone with a long edge aligned with a long edge of the screen and a short edge aligned with a short edge of the screen, and a native application executing on the smartphone can switch a set of pixels adjacent the optical sensor in the payment card 100 between black (e.g., representing a '0' bit) and white (e.g., representing a '1' bit) states to transmit data to the payment card 100. Furthermore, the wireless communication module 120 can include an optical transmitter, such as an infrared light-emitting diode (LED), to enable optical transmission of data from the payment card 100 to the mobile computing device. However, the wireless communication module 120 can receive and/or transmit data from and/or to the mobile computing device over optical communication in any other suitable way.

Figure 4:
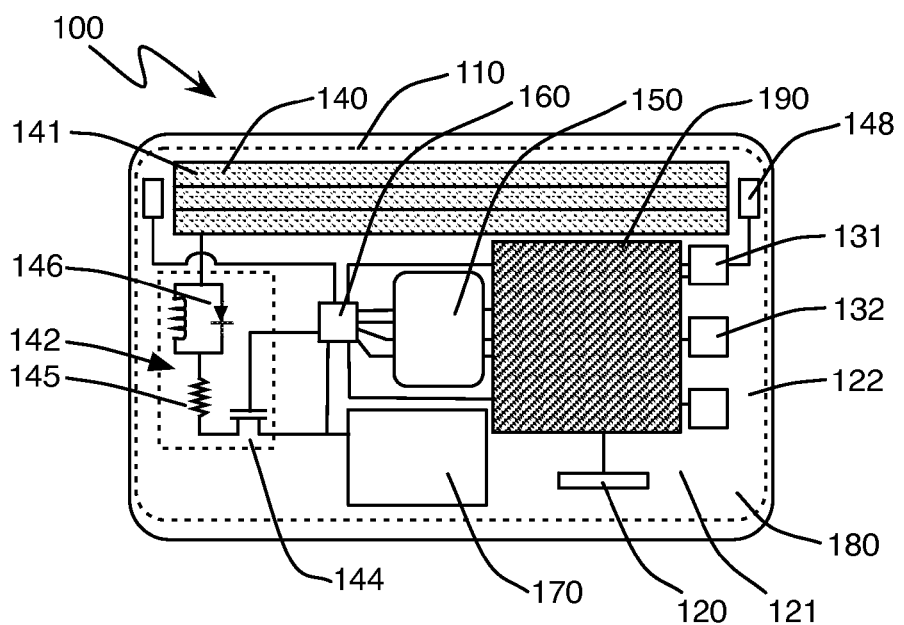
FIG. 4 is a schematic representation of a variation of the payment card.

In one alternative implementation shown in FIG. 4 the wireless communication module 120 can include an acoustic transducer, such as a microphone, configured to receive audio signals and to convert audio signals into electrical impulses. For example, to upload a magnetic sequence command for a payment method to the payment card 100, a user can place the payment card 100 adjacent a speaker of a smartphone, and a native application executing on the smartphone can control a speaker driver to transmit card data acoustically to the payment card 100. The wireless communication module 120 can further include a speaker and speaker driver to enable similar acoustic communication of data from the payment card 100 to the mobile computing device. In this implementation, the processor 160 can pass digital data stored in memory through an audio CODEC where it is converted to an analog signal. The analaog signal can then amplified through a speaker and transmitted wirelessly as sound waves. The analog signal can be transmitted according to frequency shift keying (FSK), on-off keying (OOK), or phase shift keying (PSK) techniques, such as with around a frequency of 20 kHz. However, the wireless communication module 120 can function in any other way and include any other suitable component to enable wireless communication of data between the payment card 100 and the mobile computing device.

The first input region 131 and the second input region 132 of the payment card 100 are arranged within the sheet 110 adjacent the first icon 111 and adjacent the second icon 112, respectively. Generally, the first icon 111 and the second icon 112 function to capture inputs on the sheet 110 to enable user selection from available payment methods and to enable authentication of the payment card 100 for a payment, as described below. As described above, the payment card 100 can include additional input regions, such as a third input region aligned with a third icon and a fourth input region aligned with a fourth icon.

In one implementation, the first input region 131 includes a first touch sensor, and the second input region 132 includes a second touch sensor, and the first and second touch sensors can be discrete. Alternatively, the first and second touch sensors can be physically coextensive, wherein a single touch sensor can be arranged behind the first icon 111 and the second icon 112 to capture inputs over both the first icon 111 and the second icon 112. The first input region 131 and/or the second input region 132 can therefore include a capacitive touch sensor, an optical touch sensor, a resistive touch sensor, or any other suitable type of touch sensor. Furthermore, as in the implementation described above in which the sheet 110 includes a front layer 116 and a back layer 117 that sandwich a flexible circuit board 180, the first touch sensor and the second touch sensor can be installed or fabricated on the flexible circuit board 180 and configured to detect a touch on the surface of the sheet 110 through the front layer 116. However, the first and second touch sensors can be arranged in any other way and can function in any other way to detect a touch on a surface of the sheet 110.

In another implementation, the first input region 131 includes a first mechanical switch, and the second input region 132 includes a second mechanical switch. The first and second mechanical switches can each be a dome switch or any other suitable type of mechanical momentary switch. The dome switch can be installed on the flexible circuit board 180, the flexible circuit board 180 can be installed or 'potted' over an interior broad face of a back layer 117 of the sheet 110, and the front layer 116 of the sheet 110 can be flexible (e.g., a silicone-based elastomer) and overlaid on top of the flexible circuit board 180 and mechanical switches such that a user may depress the first icon 111, the forward-facing layer of the sheet 110 may deform locally, and the first mechanical switch may close to trigger an input. In this configuration, the user may similarly depress the second icon 112, the forward-facing layer of the sheet 110 may deform locally, and the second mechanical switch may close to trigger a second input. However, the first input region 131 and the second input region 132 can include any other type of contact or contactless sensor to detect an input on a surface of the sheet 110 proximal the first icon 111 and the second icon 112.

The magnetic stripe emulator 140 of the payment card 100 functions to imitate one or more tracks of a static magnetic stripe of a standard plastic bank card. As shown in FIG. 2A, the magnetic stripe emulator 140 can include a set of (i.e., one or more) electromagnetic coils 141 controlled by the processor 160 through a coil drive circuit 142 to output data in the form of changing magnetic field polarities. For example, as shown in FIG. 2A, the magnetic stripe emulator 140 can include a set (i.e., one or more) coil 141 and a coil drive circuit 142 that includes a transistor 144, a resistor 145, and a diode 146. A voltage on the gate of transistor can enable current to flow from a battery 170 to a coil, and the resistor can enable a drive current through the coil. The diode can be coupled in parallel with the coil to protect against voltage pulses inherent in coil inductance. The coils drive circuit can additionally or alternatvively include an H-bridge to drive the coil in both positive and negative directions to reverse a magnetic field output.

Generally, the processor 160 can control the coil drive circuit according to a magnetic sequence command to switch a polarity of one or more coils in the magnetic stripe emulator 140. For example, the coil drive circuit can pass current through a coil of the magnetic stripe emulator 140 in a first direction to represent a '0' bit, and the coil drive circuit can switch the direction of current passing through the coil to represent a '1' bit. Each magnetic stripe sequence command can include a series of bits (i.e., '0's and '1's) representing a set of bits in a static magnetic stripe in a corresponding plastic bank card, and the processor 160 can control the coil drive circuit according to the bits in the magnetic stripe sequence command to enable the magnetic stripe emulator 140 to imitate the corresponding static plastic bank card.

In one example implementation, a magnetic sequence command includes data commonly included in a Track 2 standard (i.e., a banking industry magnetic tripe standard) including: a start sentinel (e.g., ';'); a primary account number (PAN) (e.g., a credit card number); a separator (e.g., '='); an expiration date (e.g., alphanumeric characters in the form of 'YYMM'); a service code (e.g., a first digit specifying interchange rules, a second digit specifying authorization processing, a the third digit specifying a range of services); discretionary data (e.g., a card verification code (CVV); an end sentinel (e.g., '?'); and/or a longitudinal redundancy check (LRC) (e.g., a validity character calculated from other data on the track). The processor 160 can control the magnetic strip emulator, through the coil drive circuit, to sequentially output bits corresponding to the any of the foregoing data. The processor 160 can also control a first coil of the magnetic stripe emulator 140 according Track 2-type data and a second coil of the magnetic stripe emulator 140 according to another data structure, such as Track 1-type or Track 3-type data.

Figure 5:
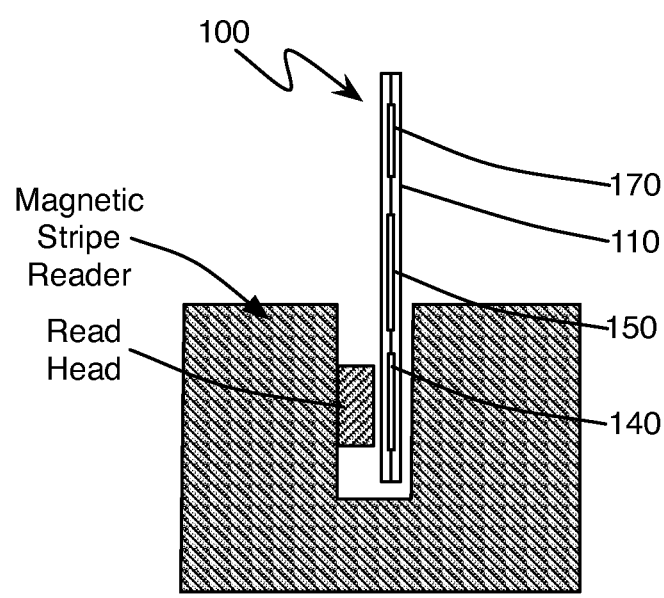
FIG. 5 is a schematic representation of a variation of the payment card and a magnetic stripe reader.

The processor 160 and the magnetic stripe emulator 140 can also cooperate to detect a read head of a magnetic stripe reader (shown in FIG. 5) as the payment card 100 is swept along the read head, and the processor 160 can drive the set of electromagnetic coils, via the coil drive circuit, according to the position and/or velocity (i.e., speed and direction) of the magnetic stripe emulator 140 relative to the read head as the payment card 100 is passed through the magnetic stripe reader. In one example, the magnetic stripe emulator 140 can include a first coil configured to sense a read head and a second coil to output bits according to a magnetic sequence command. In another example, the processor 160 can cooperate with a coil of the magnetic stripe emulator 140 to detect a read head, and, once a read head is detected, the processor 160 can control the coil via the coil drive circuit to output bits according to a magnetic sequence command. By detecting a read head through the magnetic stripe emulator 140, the processor 160 can time or 'clock' sequential bits output by the magnetic stripe emulator 140 such that the payment card 100 appears to a standard magnetic stripe reader as a typical static plastic bank card and such that a standard magnetic stripe reader can detect and decipher magnetic pulses from the magnetic stripe emulator 140 (substantially) without modification. The processor 160 can thus "couple" the magnetic tripe emulator to a read head of a magnetic stripe reader as the payment card 100 is swiped through the magnetic stripe reader, as shown in FIG. 5. However, the magnetic stripe emulator 140 can include any other number of coils configured to detect or output any other data to a magnetic read head in any other suitable way.

The magnetic stripe emulator 140 can also be arranged parallel to and offset from a long edge of the polymer layer. For example, the magnetic stripe emulator 140 can be arranged in a location similar to a standard static magnetic stripe position on a standard plastic bank card. Furthermore, the set of electromagnetic coils of the magnetic stripe emulator 140 can be of a length and width similar to that of a standard static magnetic stripe on a standard plastic bank card. For example, the coils of the magnetic stripe emulator 140 can be arranged approximately 0.223" (5.66 mm) from each short edge of the payment card 100 and can be approximately 0.375" (9.52 mm) in width. Such arrangement of the magnetic stripe emulator 140 in the payment card 100 may thus enable the payment card 100 to be read by standard magnetic stripe readers already in use to read standard (i.e., static) plastic bank cards. However, the magnetic stripe emulator 140 can be arranged in any other way, can be of any other form or geometry, and can function in any other way to imitate a static magnetic stripe of a plastic bank card.

The processor 160 of the bank card is arranged within the sheet 110 and is configured to transition from a passive setting to an active setting in response to receiving a voltage output from the transducer 150, to receive the first magnetic sequence command associated with a first payment method and the second magnetic sequence command associated with a second payment method through the wireless communication module 120, to assign the first payment method to the first input region 131 and the second payment method to the second input region 132, to receive the selection for the second payment method from the second input region 132 in response to an input adjacent the second icon 112, and to control the magnetic stripe emulator 140 according to the second magnetic sequence command in response to the selection for the second payment method. Generally, the processor 160 function to control the magnetic stripe emulator 140 according to a tap on the payment card 100, available payment methods stored on the payment card 100, availability of a wireless connection with a mobile computing device, inputs on the input regions, and/or selection of a payment method through the input region, etc.

As described above the processor 160 can be electrically coupled to the transducer 150 via a trace on the flexible circuit board 180. In particular an output of the transducer 150 can be electrically coupled to an interrupt input of the processor 160 such that a voltage spike generated by the transducer 150 in response to a tap on a surface of the payment triggers the processor 160 to switch from a passive (i.e., low-power) state to an active setting in which the processor 160 monitors various inputs from the wireless communication module 120, the input regions, the magnetic stripe emulator 140 (e.g., to detect a read head of a magnetic stripe reader), etc. and generates various outputs to control the magnetic stripe emulator 140 and/or other components of the payment card 100. For example, when the processor 160 receives a voltage spike from the transducer 150 and transitions from the passive setting to the active setting, the processor 160 can toggle one or more LEDs within the payment card 100 to provide visual feedback to a user that the payment card 100 is activated or 'ON.'

Alternatively, the processor 160 can be coupled to another input mechanism on the payment card, such as a mechanical switch, a strain gauge, a light or infrared detector, etc., and the processor can transition out of a passive setting in response to an input or output state change of the input mechanism. However, the processor 160 can interface or receive an output from any other suitable component within the payment card 100 to initiate an active mode or a payment mode on the payment card 100.

Once in the active setting, the processor 160 can interface with the wireless communication module 120 to attempt wireless communication with the mobile computing device. In one implementation, the processor 160 cooperates with the wireless communication module 120 to identify and connect to a paired mobile computing device (e.g., wireless-enabled a smartphone or tablet). For example, the wireless communication module 120 can include a Bluetooth module, the processor 160 can store a unique Bluetooth serial identification number of the paired mobile computing device, and the processor 160 can cooperate with the wireless communication module 120 to identify the mobile computing device, within range of the payment card 100, via the unique Bluetooth serial identification number. In this example, the wireless communication module 120 can assume a 'master' function to identity one or more other Bluetooth modules within range, identify a particular Bluetooth module of the paired mobile computing device based on a stored identifier of that Bluetooth module, and establish a connection with the particular Bluetooth module in a 'slave' function. Because the mobile computing device may have a more precise clock than that coupled to the wireless communication module 120, once a connection is established between the payment card 100 and the mobile computing device, the mobile computing device can assume the master function and the payment card 100 can assume the slave function. Once a connection is established between the payment card 100 and the mobile computing device, the processor 160 can control one or more LEDs within the payment card 100 to provide visual feedback to a user that the connection was successful. For example, the processor 160 can flash a green LED three times once the connection is established. Similarly, the processor 160 can flash a red LED three times if a wireless connection with the particular mobile computing device fails. However, the processor 160 and the wireless communication module 120 can cooperate in any other way to identify, pair, and communicate with a particular mobile computing device within range.

Once the mobile computing device is identified and a wireless connection is established between the wireless communication module 120 and the mobile computing device, the processor 160 can cooperate with the wireless communication module 120 to download a magnetic sequence command associated with a particular payment method from the mobile computing device. For example, a native application executing on the mobile computing device can capture, store, and handle information for various cards. In this example, for a single bank card, the native application can store an issuing entity (e.g., a bank), an assignee (i.e., a name on the bank card), a card number, an expiration date, a verification number (e.g., a CVV number), a rewards account or username associated with the bank card, a magnetic sequence stored on a static magnetic stripe, etc. Furthermore, in this example, the processor 160 can communicate with the mobile computing device, via the wireless communication module 120, to retrieve relevant information for a particular bank card, such as the magnetic sequence of the particular bank card in the form of a magnetic sequence command.

In one example implementation, once a wireless connection is established between the payment card 100 and the mobile computing device, the processor 160 cooperates with the wireless communication module 120 to synchronize or 'sync' with the native application executing on the mobile computing device, wherein the processor 160 downloads pertinent information (i.e., a magnetic sequence command) for each of a number of plastic bank cards corresponding to the number of input regions on the payment card 100. In one example in which the payment card 100 includes the first input region 131 adjacent the first icon 111 and the second input region 132 adjacent the second icon 112, the processor 160 can sync with the native application to download a first magnetic sequence command for a first payment method and a second magnetic sequence command for a second payment method. In another example in which the payment card 100 includes the first input region 131 adjacent the first icon 111, the second input region 132 adjacent the second icon 112, and a third input region adjacent a third icon, the processor 160 can sync with the native application to download a first magnetic sequence command for a first payment method, a second magnetic sequence command for a second payment method, and a third magnetic sequence command for a third payment method. The magnetic sequence commands downloaded to the payment card 100 from the mobile computing device can include magnetic sequence commands for a default selection of available payment methods, a ranked selection of available payment methods, a manual selection of available payment methods (e.g., a selection entered by a user through an interface within the native application), or any other suitable selection of available payment methods.

The processor 160 can automatically sync with the native application once a wireless connection is established between the wireless communication module 120 and the mobile computing device. Alternatively, the native application can push payment method information to the payment card 100 in response to a manual input entered through the native application, or the processor 160 can request a payment method update in response to a manual input on one or more input regions of the payment card 100. For example, the processor 160 can receive sequence of inputs through the input regions (i.e., the first input region 131, the second input region 132 and/or any additional input region), correlate the series of inputs with a request to sync with the native application, and transmit a request to the mobile computing device, via the wireless communication module 120, to sync an updated selection of payment methods. However, the processor 160 can function in any other way to download magnetic sequence commands corresponding to one or more payment methods from the mobile computing device via the wireless communication module 120.

In one alternative described in U.S. Provisional Application No. 61/848,581, which is incorporated in its entirety by reference, the processor 160 can also implement a "quick-sync" feature to download payment method data from the mobile computing device. For example, a user can select a specific payment method for one-time use (i.e., a single active session or one swipe) through the native application, and the wireless communication module 120 can sync with the native application (through the quick-sync feature) once a wireless connection is established to download the specific payment method for one-time use. In this example, the quick sync feature can thus enable the user to communicate instructions to the payment card 100 to emulate a specific payment method for one-time use without changing payment method assignments for the input regions.

The processor 160 subsequently functions to assign each payment method—corresponding to a received magnetic sequence command—to one input region on the payment card 100. In one implementation, the processor 160 receives a first magnetic sequence command corresponding to a first payment method and a second magnetic sequence command corresponding to a second payment method, and the processor 160 subsequently associates the first magnetic sequence command with the first input region 131 (and therefore the first icon 111) and associates the second magnetic sequence command with the second input region 132 (and therefore the second icon 112). In one example of this implementation, the processor 160 can receive an input on the first input region 131, correlate the input with a selection for the first payment method, and thus power the magnetic stripe emulator 140 according to the first magnetic sequence command to enable payment with the first payment method, as described below. Subsequently, the processor 160 can receive an input on the second input region 132, correlate the input with a selection for the second payment method, and thus power the magnetic stripe emulator 140 according to the second magnetic sequence command to enable payment with the second payment method.

As described above, the processor 160 can receive a ranked set of payment methods, and the processor 160 can assign the corresponding magnetic sequence commands according to their rankings. For example, the native application can rank three payment methods, including a credit card as a first payment method, a debit card as a second payment method, and a gift card as a third payment method, the processor 160 can receive the ranked set of three payment methods, and the processor 160 can assign the set of payment methods to the first input region 131, the second input region 132, and a third input region accordingly. As described below, the native application executing on the mobile computing device can display a virtual representation of the input regions of the payment card 100 and an overlay on top of each virtual input region indicating the particular payment method assigned to each particular input region. The mobile computing device can thus function as a remote display for the payment card 100 to provide visual information pertaining to payment methods assigned to various input regions without necessitating a refreshable display within the payment card 100. However, the processor 160 can assign payment methods to respective input region in any other way or according to any other rank, schema, or process.

Thus, when a user taps on the payment card 100 and the processor 160 wakes from a passive setting, the processor 160 can attempt wireless communication with the mobile computing device through the wireless communication module 120 to authenticate use of the payment card 100. Generally, the payment card 100 can be linked (i.e., paired) to the mobile computing device, and the processor 160 can require identification of and communication with the mobile computing device before enabling a payment function of the magnetic stripe emulator 140. For example, the payment card 100 can function under the assumptions that a valid user (i.e., a valid owner) of the payment card 100 will carry both the payment card 100 and the mobile computing device on his person when attempting a transaction and that an invalid user (i.e., a thief) of the payment card 100 may only have the payment card 100 and not the mobile computing device paired with the payment card 100. Thus, the processor 160 can implement a level of security to prevent fraudulent use of the payment card 100 by necessitating a connection between two components of the payment system (i.e., the payment card 100 and the mobile computing device) substantially likely to be carried together by a valid user but substantially unlikely to be carried together by an invalid user. Furthermore, when the payment card 100 and the paired mobile computing device establish a wireless connection, the payment card 100 can sync with the mobile computing device to download new or updated payment method information (e.g., magnetic stripe sequence commands) from the mobile computing device, such as in response to an automatic sync'ing feature or a manual sync request.

Alternatively, if the processor 160 and the wireless communication module 120 fail to establish a wireless connection with the mobile computing device, the processor 160 can suppress a payment function of the magnetic stripe emulator 140 (e.g., by suppressing power to the magnetic stripe emulator 140) to prevent use of the payment card 100 in a transaction. However, instances may occur in which a valid user has lost or forgotten the paired mobile computing device, the mobile computing device has 'died' or run out of battery charge, or a short-range wireless communication (e.g., Bluetooth) function on the mobile computing device is turned OFF, and the processor 160 can account for these situations by authorizing use of the payment card 100 with a passcode (e.g., a personal identification number or PIN) entered directly into the payment card 100. For example, the processor 160 can receive a series of inputs entered into the input regions, compare the series of inputs to a passcode stored on the payment card 100 (i.e., in memory), and authenticate use of the payment card 100 if the series of inputs matches the passcode. In this example, when a user first creates an account with the native application executing on the mobile computing device, the native application can display a virtual representation of the input regions on the display of the mobile computing device, prompt the user to enter a sequence of inputs on the input regions (e.g., a sequence of four inputs), store the sequence of inputs as a personal passcode for the user, and transmit the passcode to the payment card 100 upon a subsequent sync event.

Alternatively, the processor 160 can implement similar methods to interface with the transducer 150 to authenticate a series of taps on a surface of the sheet 110 as a passcode. For example, the processor 160 can authenticate a specific number, sequence, and/or interval (e.g., timing) of impulses on the sheet 110 as a passcode and thus unlock the payment card 100 for use. However, the processor can implement any other method or technique to authenticate use of the payment card 100 through an input, tap, or impulse on a surface of the sheet 110.

Therefore, the processor 160 can lock a payment function of the magnetic stripe emulator 140 until the wireless communication module 120 establishes a connection the mobile computing device or until a user enters a valid passcode directly into the payment card 100 via the input regions. The processor 160 can thus enable security features of the payment card 100 to prevent use of the payment card 100 by an invalid or unauthorized user but also to enable access to the payment function of the card for a valid user who is either carrying the paired mobile computing device or who knows the passcode. Furthermore, once a valid passcode is received, the processor 160 can control one or more visual elements within the payment card 100 to provide visual feedback to a user that the passcode was authenticated, such as by flashing a green LED three times. Similarly, the processor 160 can flash a red LED three times if the passcode attempt was invalid. However, the processor 160, the input regions, and/or the wireless communicate module can cooperate in any other way to authenticate use of the payment card 100 for an upcoming payment.

Once the processor 160 authenticates use of the payment card 100 through a connection with the mobile computing device or through a valid passcode manually entered on the payment card 100, the processor 160 can cooperate with the input regions to receive a selection for a particular payment method from a set of payment methods assigned to the input regions. In one example, the processor 160 sets a first payment method assigned to the first input region 131 as a default payment method such that, when swiped through a magnetic stripe reader, the processor 160 controls the magnetic stripe emulator 140 according to the first magnetic sequence command associated with the first payment method. However, in this example, if the user selects the second input region 132 assigned to the second payment method, the processor 160 can switch from a first payment mode corresponding to the first payment method to a second payment mode corresponding to the second payment method. Subsequently, when the payment card 100 is swiped through a magnetic stripe reader, the processor 160 can control the magnetic stripe emulator 140 according to the second magnetic sequence command to enable payment through the second payment method.

The processor 160 can correlate a single input on a single input region as a selection for a payment method assigned to the single input region, such as described above. In this implementation, the payment card 100 can store magnetic sequence commands for a number of payment methods corresponding to the number of input regions on the payment card 100. The processor 160 can further identity substantially simultaneous inputs on two or more input regions as selection of an additional payment method. For example, the processor 160 can identify substantially simultaneous inputs on the first input region 131 and the second input region 132 as selection of a third payment method.

In another implementation, the processor 160 can respond to one or more inputs on the inputs regions by scrolling through a set of payment methods stored in memory on the payment card 100. The processor 160 can thus access and enable more payment methods than input regions on the payment card 100. In one example, the processor 160 defaults to a standard mode, wherein each input region is associated with a single payment method in a set of preferred, default, or most-used payment methods, but switches to a scroll mode when the user depressed two or more input regions for a threshold period of time. In the scroll mode the processor 160 can respond to an input on the first input region 132 by scrolling upward through a list of stored payment methods, the processor 160 can respond to an input on the second input region 132 by scrolling downward through the list of stored payment methods, and the processor can respond to an input on a third input region by selecting a particular payment method for subsequent emulation. Alternatively, the processor 160 can respond to a taps on the sheet 110 by scrolling through the list of stored payment methods. The processor 160 can also interface with the mobile computing device, via the wireless communication module 120 to display a currently-selected payment method and adjacent payment methods in the list of stored payment methods.

However, the processor 160 can assign payment methods to one or a combination of input regions in any other suitable way and can determine user selection of a payment method through one or more input region according to any other schema.

In applications in which the processor 160 has established a wireless connection with the mobile computing device through the wireless communication module 120, the processor 160 can further transmit a user selection for a payment method to the mobile computing device through the wireless communication module 120. In one implementation, the native application executing on the mobile computing device manipulates the receive payment method selection to provide visual feedback of a user's payment method section. For example, the native application can display a virtual representation of the payment card 100, including the first icon 111 and the second icon 112, and highlight an icon corresponding to the selected payment method, such as with a green border or bold typeface. However, the processor 160 can transmit a payment method selection to the mobile computing device in any other way, and the native application executing on the mobile computing device can provide any other suitable type of feedback to a user in any other way.

Alternatively, the native application can receive a user selection for a payment method through the mobile computing device, such as through a touchscreen displaying a list of available payment methods or a virtual representation of the payment card 100, including virtual representations of the first and second icons assigned to a first payment method and a second payment method, respectively. The mobile computing device can then push the user payment method selection to the payment card 100. However, the processor 160 can function in any other way to receive a user payment method selection directly through an input region or indirectly through the mobile computing device.

Once a payment method is selected manually by a user or by default, the processor 160 can control the magnetic stripe emulator 140 according to a magnetic sequence command corresponding to the selected payment method. Generally, as described above, the magnetic stripe emulator 140 can include a set of coils and a coil drive circuit, and the processor 160 can control the coil drive circuit to drive the set of coils according to a magnetic sequence command. In one implementation and as described above, the processor 160 and the magnetic stripe emulator 140 cooperate to detect a read-head of a magnetic stripe reader, and the processor 160 can couple the magnetic stripe emulator 140 to the read-head of a magnetic stripe reader by stepping through the selected magnetic sequence command according to a position and/or velocity of the payment card 100 relative to the read head.

As described above, the processor 160 can cooperate with the magnetic stripe emulator 140 to detect a local read head of a magnetic stripe reader. The processor 160 can also cooperate with the magnetic stripe emulator 140 to detect a speed or velocity of the magnetic stripe emulator 140 along the read head. In one implementation, once a local read head is detected, the processor 160 steps through bits specified in a magnetic sequence command according to a speed of the magnetic stripe emulator 140 moving along the read head. In this implementation, the processor 160 can determine a speed of the payment card 100 along the read head, calculate a magnetic stripe emulator bit rate by multiplying the speed of the card by a standard magnetic stripe bit density, and step through the magnetic sequence command (i.e., control the magnetic stripe emulator 140) according to the magnetic stripe emulator 140 bit rate. For example, the magnetic sequence command can include Track 2-type data with a bit density of seventy-five bits per inch, the processor 160 can estimate a speed of the payment card 100 along the read head of two inches per second, calculate a magnetic stripe emulator bit rate of 150 bits per second, and control the magnetic stripe emulator 140 to step through 150 bits per second. The processor 160 can also select a magnetic stripe emulator bit rate that is faster than a product of the estimated payment card speed and the magnetic stripe bit density to ensure the magnetic sequence is fully output before the payment card 100 exits the magnetic stripe reader. As in the foregoing example, the processor 160 can set a magnetic stripe emulator bit rate that of 165 bits per second, which is ten percent greater than the product of the estimated payment card speed and bit density.

As shown in FIG. 2A, the payment card 100 can additionally or alternatively include one or more discrete read head sensors 148 arranged within the sheet 110 and configured to detect a read head of a magnetic stripe reader, and the processor 160 can cooperate with the one or more read head sensors 148 to couple the magnetic stripe emulator 140 to the magnetic stripe reader. The processor 160 can also interface with an accelerometer, gyroscope, Hall effect sensor, or other sensor within the payment card 100 to detect a read head and/or to determine a speed of the payment card 100 along a read head. However, the processor 160 can control the magnetic stripe emulator 140 in any other suitable way and according to any other schema.

Once payment through the payment card 100 is authenticated and/or once a user selects a payment method, the processor 160 can set a payment timer, such as a two-minute or a five-minute timer. Upon expiration of the payment timer, the processor 160 can cut power to the magnetic stripe emulator 140, return to the passive setting, or otherwise terminate a payment function of the payment card 100. Alternatively, once the payment card 100 is swept through a magnetic stripe reader during a transaction, the processor 160 can terminate the payment function of the payment card 100. Similarly, once the payment card 100 is swept through a magnetic stripe reader during a transaction, the processor 160 can initiate a payment timer, such as a ten-second or one-minute timer, wherein the processor 160 withdraws the payment function of the payment card 100 and returns to the passive setting if an additional swipe is not attempted prior to expiration of the timer. However, the processor 160 can discontinue the payment function of the payment card 100 and/or return to the passive state in any other way and according to any other trigger or timer.

Figure 2B:
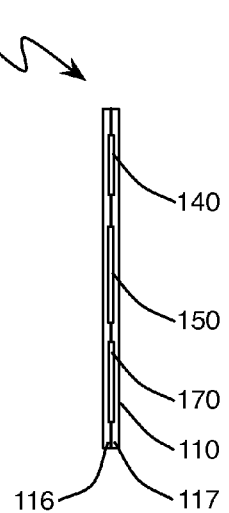

As shown in FIG. 2A, one variation of the payment card 100 includes a flexible circuit board 180 board arranged within the sheet 110. As described above and shown in FIG. 2B, the flexible circuit board 180 can be sandwiched between two layers of the sheet 110 and can include traces, contacts, and/or via to communicate analog and/or digital signals between various electronic components of the payment card 100. The flexible circuit board 180 can include a fiberglass, silicone, or polymer substrate or a substrate of any other suitable material. The flexible circuit board 180 can also be substantially thin and can include cavities or recesses to receive analog circuit components (e.g., resistors, capacitors) and/or integrated circuits (e.g., a microprocessor, a voltage regulator) such that the maximum height of the flexible circuit board 180 with components installed does not exceed a thickness of a standard plastic bank card. Furthermore, electrical components installed on the flexible circuit board 180 can exclude potting material in order to minimize component size (i.e., height). For example, the processor 160 can be a microprocessor including multiple (e.g., thousands or millions of) transistors fabricated on a silicone wafer, trimmed, shaved, and installed on the flexible circuit board 180 without encasement in a potting material. However, the flexible circuit board 180 can be of any other material, can be of any other geometry, include any other feature, and/or function in any other way to electrically couple various components of the payment card 100.

As shown in FIG. 2A, one variation of the payment card 100 further includes a battery 170 arranged within the sheet 110 and electrically coupled to the processor 160 via the flexible circuit board 180 board. Generally, the battery 170 functions to power the processor 160, the wireless communication module 120, the magnetic stripe emulator 140, and other components of the payment card 100. The battery 170 can be substantially thin. The battery 170 can include multiple cells that are flexible by nature of their thin cross-sections, or the battery 170 can include multiple cells with gaps therebetween such that the battery 170 can flex across the gaps. The battery 170 can be sandwiched between two layers of the sheet 110 adjacent the flexible circuit board 180, mounted on the flexible circuit board 180, or arranged in any other way within the payment card 100. The battery 170 can be a lithium-ion, lithium-polymer, NiCd, or any other suitable type of battery and can be rechargeable or non-rechargeable. The processor 160 can also sense a remaining charge on the battery 170 and output battery level feedback to a user, such as by flashing an LED within the sheet 110 accordingly to current battery level. Alternatively, the wireless communication module 120 can transmit battery status to the native application executing on the mobile computing device to display battery information for the user.

Figure 3:
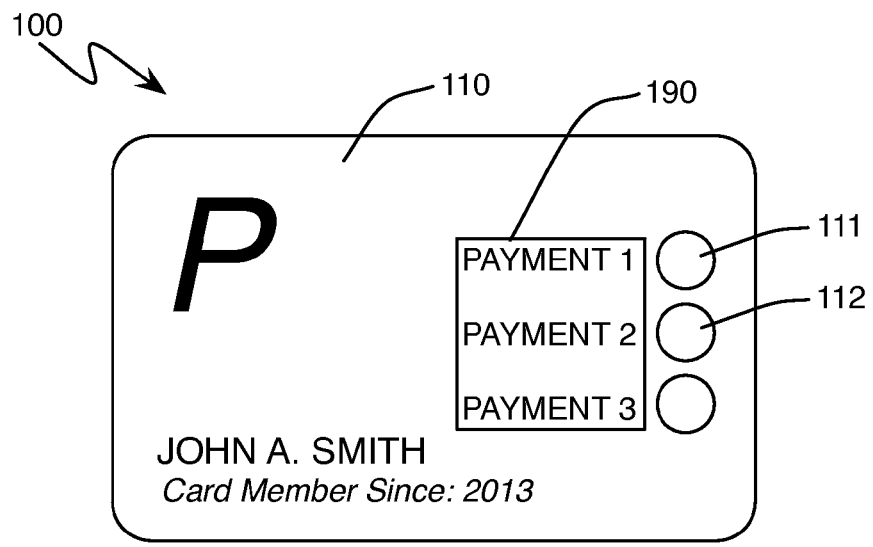
FIG. 3 is a schematic representation of a variation of the payment card.

As shown in FIGS. 3 and 4, one variation of the payment card 100 further includes a display 190 visible through a layer of the sheet 110. For example, the display can include an e-paper or e-ink display. The display can output alphanumeric characters corresponding to a card number of a selected payment method, a CCV of a selected payment method, a cardholder's (i.e., the user's) name, payment method assignments to input regions, or any other relevant data pertaining to a user, a payment method, or a function of the payment card 100.

However, the payment card 100 can also include any other component and can function in any other way to consolidate multiple payment sources into one payment card with a magnetic stripe emulator configured to output a magnet form of bits to mimic static magnetic stripes of various standard plastic bank cards.

In addition or as an alternative to the magnetic stripe emulator 140, the payment card 100 can include a near-field communication (NFC) tag emulator, a radio-frequency identification (RFID) tag emulator, and/or any other payment authorization protocol emulator. For example, the payment card 100 can include rewriteable NFC tag, the processor 160 can store NFC commerce transaction identifiers for a set of NFC-based payment methods, and the processor 160 can rewrite the NFC tag with a NFC commerce transaction identifier for a selected payment method. In another example, the payment card 100 can include an RFID reader detector and an RFID tag emulator, the processor 160 can store RFID commerce transaction identifiers for a set of RFID-based payment methods, the processor 160 can cooperate with the RFID reader detector to detect a local RFID reader, and the RFID tag emulator can output a RFID commerce transaction identifier for a selected RFID payment method. However, the payment card 100 can include and implement any other payment authorization protocol emulator, and any of the foregoing and subsequent methods can be implemented to enable consolidation of one or more plastic bank card, NFC, RFID, and/or gift card payment methods on a single payment card.

2. First Method

Figure 6:
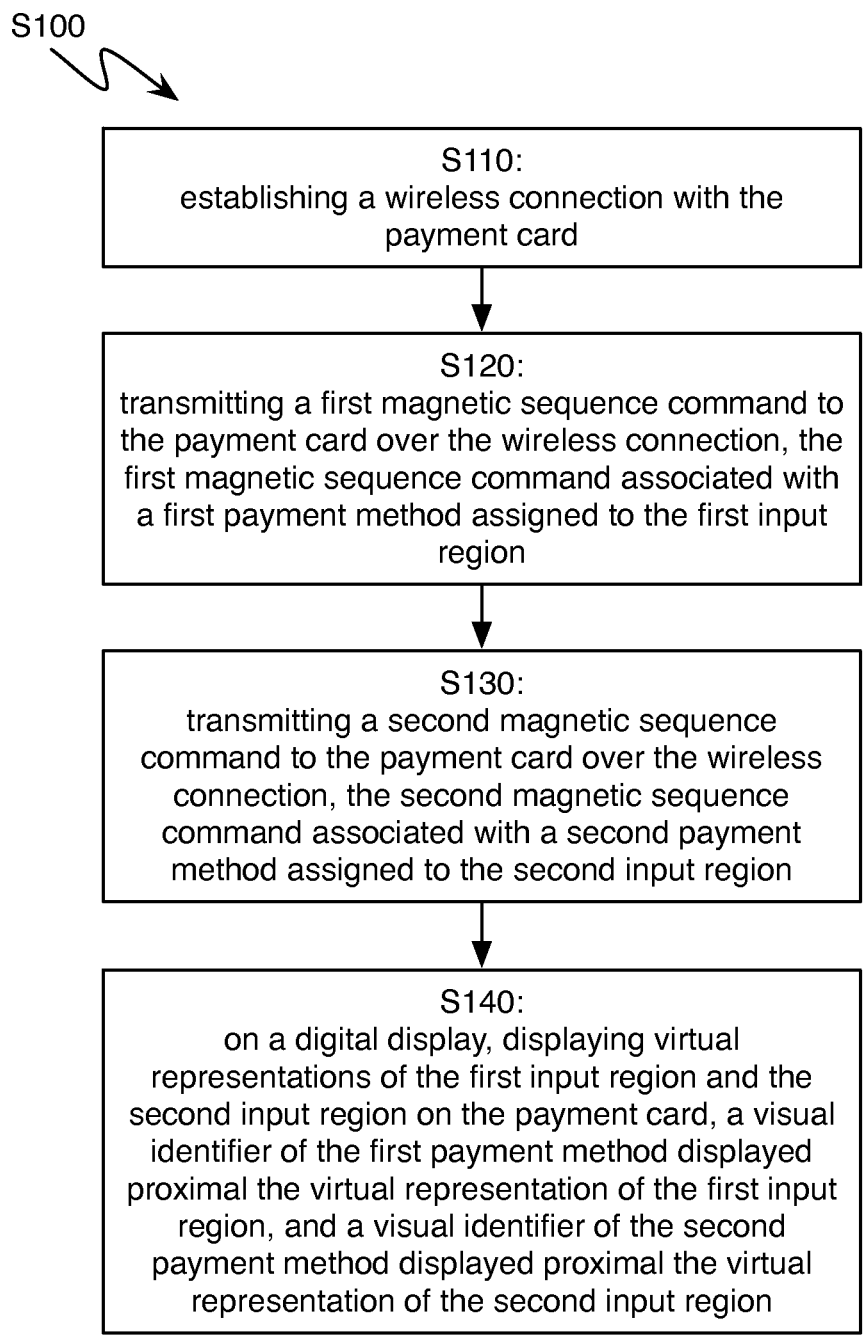
FIG. 6 is a flowchart representation of a first method.
Figure 8:
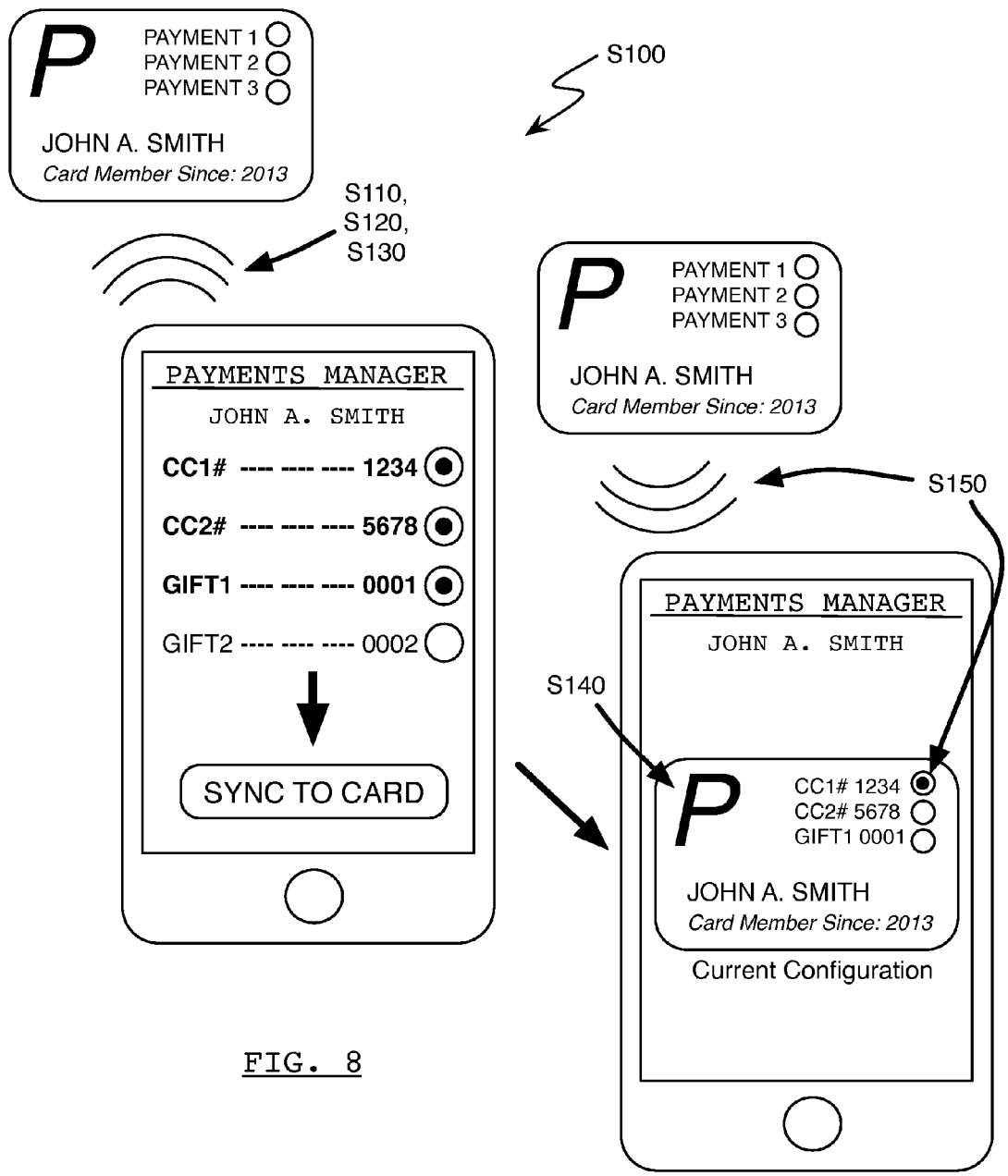
FIG. 8 is a flowchart representation of a variation of the first method.

As shown in FIGS. 6 and 8, first method S100 for controlling a payment card including a magnetic stripe emulator, a first input region, and a second input region, includes: establishing a wireless connection with the payment card 100 in Block S110; transmitting a first magnetic sequence command to the payment card 100 over the wireless connection in Block S120, the first magnetic sequence command associated with a first payment method assigned to the first input region 131; transmitting a second magnetic sequence command to the payment card 100 over the wireless connection in Block S130, the second magnetic sequence command associated with a second payment method assigned to the second input region 132; and on a digital display, displaying virtual representations of the first input region 131 and the second input region 132 on the payment card 100 in Block S140, a visual identifier of the first payment method displayed proximal the virtual representation of the first input region 131, and a visual identifier of the second payment method displayed proximal the virtual representation of the second input region 132.

Generally, first method S100 functions to enable a remote visual interface for the payment card 100 described above. In one implementation, first method S100 can be implemented through a native application executing on a mobile computing device (e.g., a smartphone, a tablet), as described above. The payment card 100 described above can store a set of payment methods and enable payment with a payment method selected from the set of payment methods through a magnetic stripe emulator, and the payment card 100 can download different sets of payment methods over time and assign various payment methods to each input region over time. However, because the payment card 100 may omit a refreshable display, a mobile computing device paired with the payment card 100 can implement first method S100 to provide visual feedback of payment methods assigned to each input region (or combination of input regions) on the payment card 100.

In one example, a user attempting to make a payment with a payment method stored on the payment card 100 can wake the payment card 100 by tapping the payment card 100 as described above, the payment card 100 and the mobile computing device paired with the payment card 100 can establish a wireless connection, the mobile computing device can transmit a first payment method and a second payment to the payment card 100, and the mobile computing device can display a virtual representation of the payment card 100 including the first input region 131 and the second input region 132 (and/or the first icon 111 and the second icon 112) with a visual representation of the first payment method overlaid over the first icon 111 and a visual representation of the second payment method overlaid over the second icon 112 according to payment methods assigned to each input region of the payment card 100. In this example, the user can thus reference the virtual representation of the payment card 100 displayed on the mobile computing device to identify what payment methods are available in the payment card 100 and which payment method is assigned to each input region on the payment card 100.

Block S110 of first method S100 recites establishing a wireless connection with the payment card 100. As described above, once the processor 160 in the payment card 100 wakes from a passive setting to an active setting, the processor 160 can control the wireless communication module 120 to search for, identify, and connect with a paired mobile computing device. In Block S110, a wireless module within the mobile computing device can cooperate with the wireless communication module 120 within the payment card 100 to establish the wireless connection. For example, the payment card 100 and the mobile computing device can communicate over Bluetooth communication protocol or any other radio-frequency-type wireless communication protocol. Alternatively, as described above, the mobile computing device can implement Block S110 by communicating with the payment card 100 over an optical- or sound-based communication channel. As described above, Block S110 can toggle a set of pixels on a display of the mobile computing device between black and white settings to optically transmit bits (i.e., data) to the payment card 100. Alternatively, as described above, Block S110 can control an audio driver (e.g., a speaker) to transmit audio signals including payment method data. However, Block S110 can establish communication with the payment card 100 through any other suitable communication protocol over any other communication channel or pathway.

Block S120 of first method S100 recites transmitting a first magnetic sequence command to the payment card 100 over the wireless connection, the first magnetic sequence command associated with a first payment method assigned to the first input region 131. Similarly, Block S130 of first method S100 recites transmitting a second magnetic sequence command to the payment card 100 over the wireless connection, the second magnetic sequence command associated with a second payment method assigned to the second input region 132. As described above, the mobile computing device can implement Block S120 by transmitting a set of payment methods to the payment card 100 over Bluetooth, over another radio-frequency-type communication protocol, through an optical connection, through an audio-based connection, or over any other suitable wireless communication protocol or communication channel.

As described, Blocks S120 and S130 can transmit requisite payment information for each payment method, such as a magnetic sequence command specifying a series of bits implementable magnetically through the magnetic stripe emulator 140 of the payment card 100 to imitate a static magnetic stripe of a corresponding plastic bank card.

Blocks S120 and S130 can also transmit a payment method rank to the payment card 100, wherein the payment rank defines a particular payment method as a default payment method. For example, Blocks S120 and S130 can specify the first payment method as the default payment method such that if a user does not select an alternative payment method through one or more input regions on the payment card 100, the payment card 100 will default to payment with the default (i.e., first) payment method.

Blocks S120 and S130 can additionally or alternatively transmit payment method assignments for each input region to the payment card 100. For example, Blocks S120 and S130 can receive a manual selection of payment methods from a user or automatically select a set of payment methods stored in the native application executing on the mobile computing device, assign one payment method in the set of payment methods to each input region on the payment card 100, and transmit the assignments to the card in conjunction with the magnetic sequence commands for each payment method in the set of payment methods. Thus, Blocks S120 and S130 can maintain a current list of payment method assignments for each input region on the card, and Block S130 can implement the list of payment method assignments to update the virtual representation of the payment card 100 including visual identifiers of the assigned payment methods. However, Blocks S120 and S130 can transmit any other suitable command, data, or specification to the payment card 100 in addition to a magnetic stripe sequence of one or more selected payment methods.

Block S120 and Block S130 can further encrypt and/or decrypt communications with the payment card 100, such as by implementing one or more authentication and/or encryption schema. For example, Blocks S120 and S130 can implement cryptographic protocols such as Diffie-Hellman key exchange or Wireless Transport Layer Security (WTLS). Blocks S120 and S130 can additionally or alternatively encrypt data according to an encryption standard such as Data Encryption Standard (DES), Triple Data Encryption Standard (3-DES), or Advanced Encryption Standard (AES). The payment card 100 can similarly encrypt and/or decrypt communications with the mobile computing device. However, Blocks S120 and S130 (and the payment card 100) can implement any other security or encryption methods to protect private or sensitive user or banking information.

Block S140 of first method S100 recites, on a digital display, displaying a virtual representation of the first input region 131 and the second input region 132 on the payment card 100, a visual identifier of the first payment method proximal the virtual representation of the first input region 131, and a visual identifier of the second payment method proximal the virtual representation of the second input region 132. Generally, Block S140 functions to provide visual feedback of payment method assignments for the input regions on the payment card 100 through a refreshable display incorporated into the mobile computing device.

As shown in FIG. 8, in one implementation, Block S140 displays a virtual image of the payment card 100 with both a descriptor of the first payment method arranged over a portion of the virtual image corresponding to the first input region 131 and a descriptor of the second payment method arranged over a portion of the virtual image corresponding to the second input region 132. The descriptor for each payment method can include a stock image, such as a brand image of a credit card issuer, a banking institution, or a credit card rewards program. For example, when a user uploads a plastic bank card into the native application executing on the mobile computing device, the native application can identify a rewards program associated with the plastic bank card, and Block S140 can automatically download a corresponding stock image for the rewards program from a remote server (i.e., over the Internet) and display the stock image over a virtual representation of corresponding input region of the payment card 100. Alternatively, when a user uploads a plastic bank card into the native application executing on the mobile computing device, the native application can prompt the user to supply a description of the plastic bank card (e.g., through a virtual keyboard displayed on a touch display of the mobile computing device), and Block S140 can display the description proximal a virtual representation of corresponding input region of the payment card 100. Similarly, when a user uploads a plastic bank card into the native application executing on the mobile computing device, the native application can prompt the user to select a stock textual or visual identifier of the plastic bank card, and Block S140 can display the identifier adjacent a virtual representation of corresponding input region of the payment card 100. However, Block S140 can function in any other way to display a virtual representation of the payment card 100 and identifiers of payment methods assigned to each input region of the payment card 100.

Figure 7:
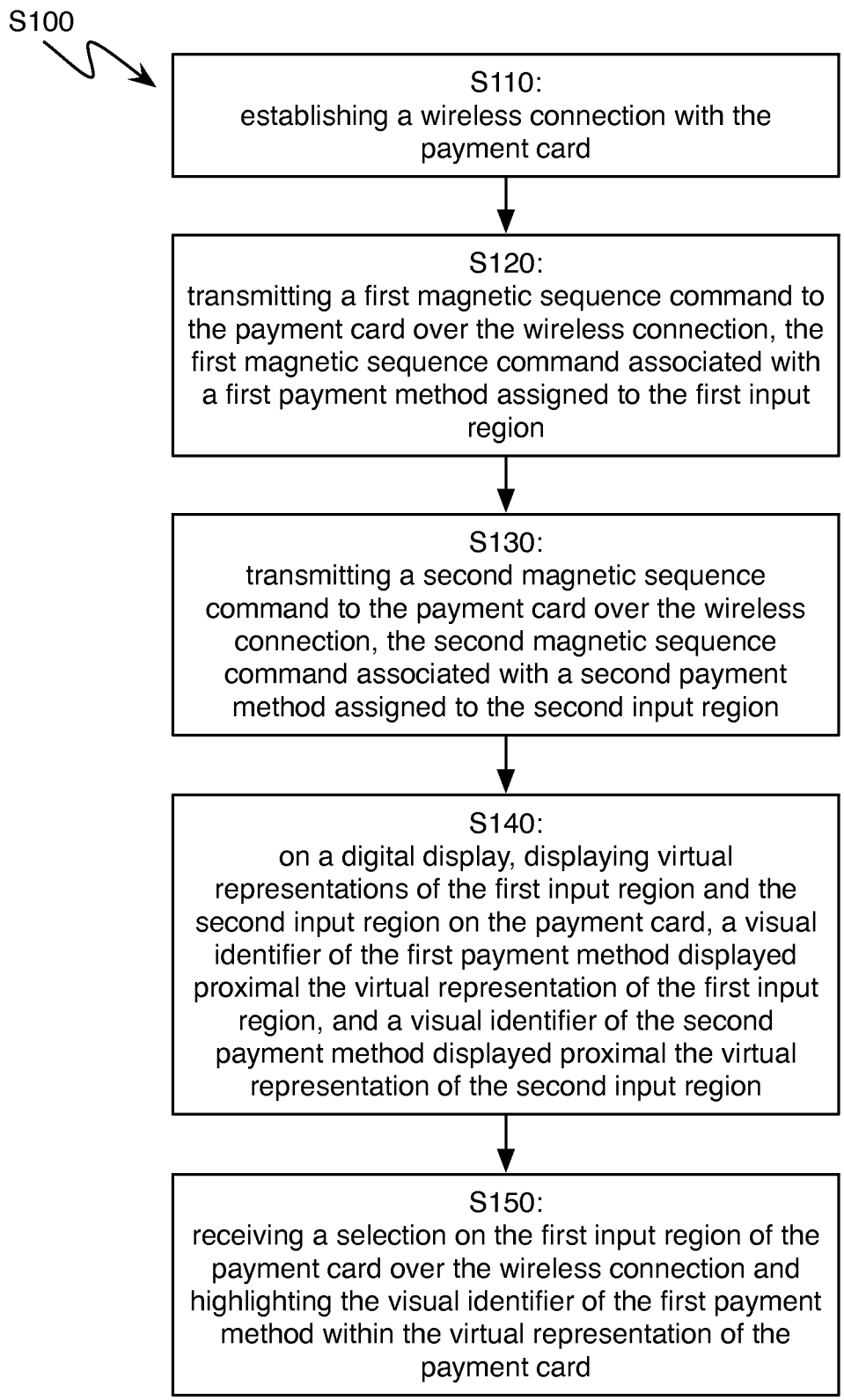
FIG. 7 is a flowchart representation of a variation of the first method.

As shown in FIG. 7, one variation of first method S100 includes Block S150, which recites receiving a selection on the first input region 131 of the payment card 100 over the wireless connection and highlighting the visual identifier of the first payment method within the virtual representation of the payment card 100. Generally, Block S150 functions to update the virtual representation of the input regions and corresponding payment methods to indicate which payment method is currently enabled on the payment card 100. For example, Block S150 can highlight, expand, embolden, alter a color or, or other visually modify the identifier displayed proximal a virtual representation of an input region corresponding to the payment method currently selected for an upcoming transaction.

In one implementation, once a transaction with the payment card 100 is authenticated, such as described above, the mobile computing device implements Block S150 by displaying a first colored (e.g., green) border around a virtual representation of an input region corresponding to a default payment method. If and when a user selects an alternative payment method by touching an input region corresponding to an other payment method, the payment card 100 can transmit the selection for the other payment method to the mobile computing device, and the mobile computing device can remove the first colored border and instead display a second colored (e.g., green) border around a virtual representation of an input region corresponding to the other payment method. However, Block S150 can function in any other way to provide visual feedback for a selection of a payment method through the payment card 100.

3. Second Method

Figure 9:
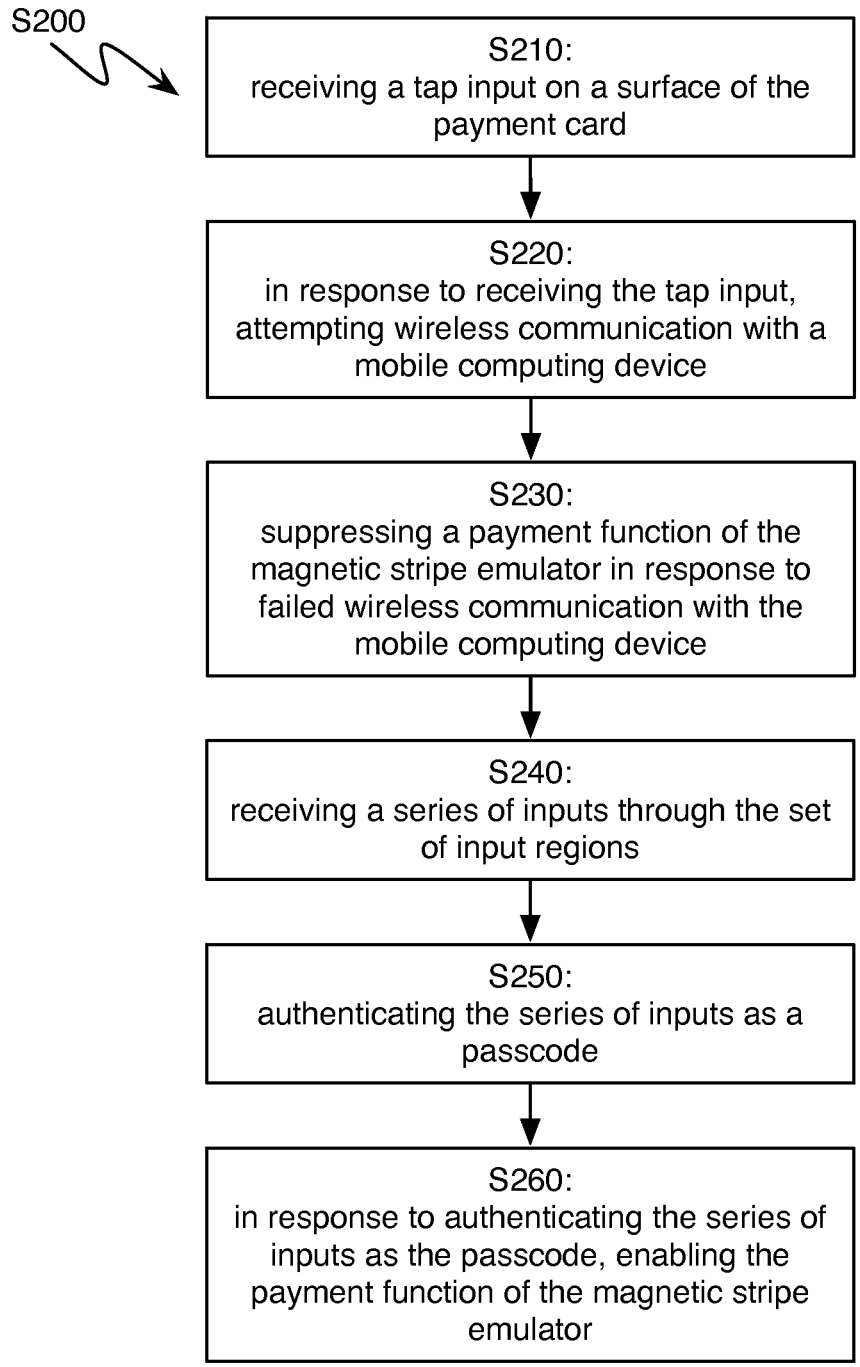
FIG. 9 is a flowchart representation of a second method.
Figure 11:
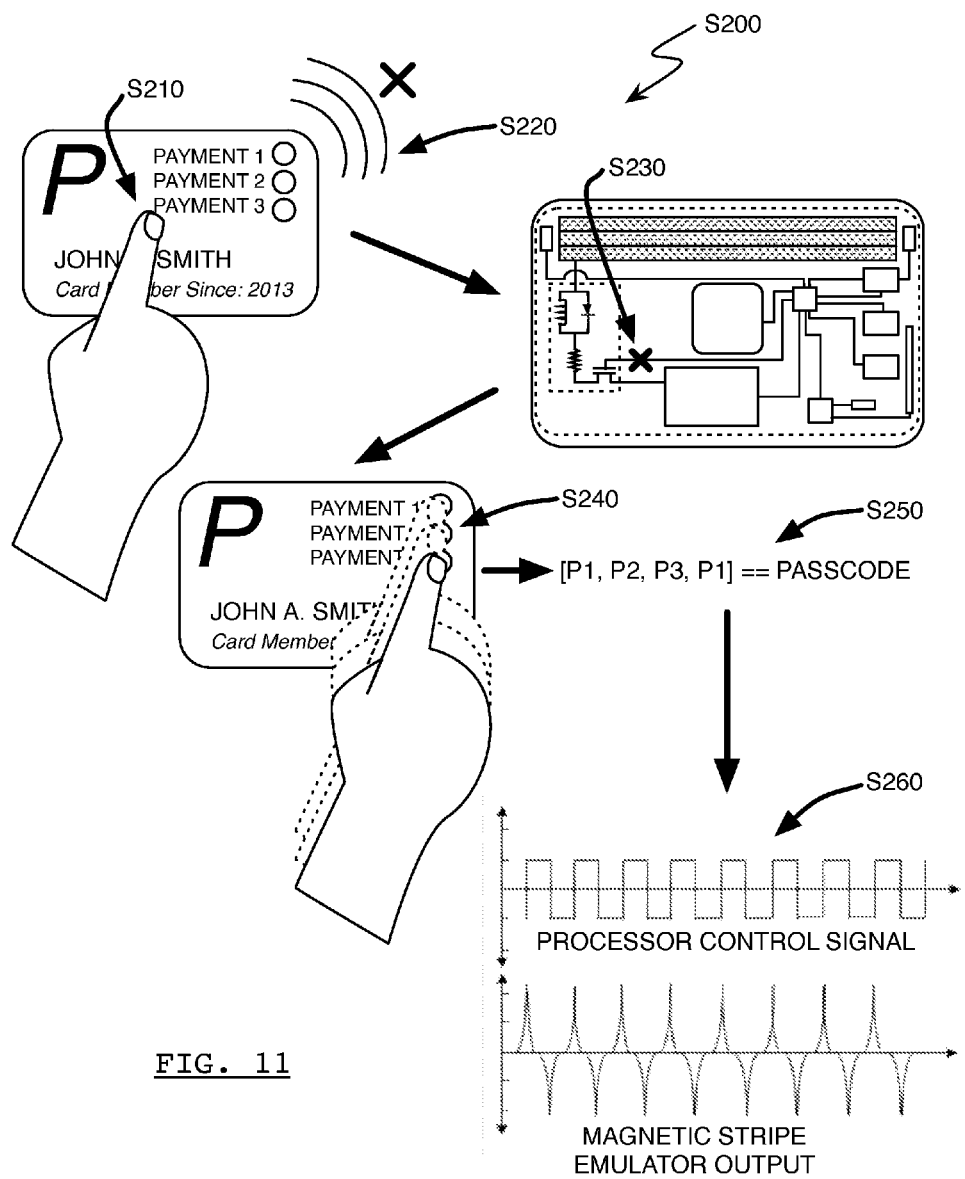
FIG. 11 is a flowchart representation of a variation of the second method.

As shown in FIGS. 9 and 11, second method S200 for controlling a payment card including a magnetic stripe emulator and a set of input regions includes: receiving a tap input on a surface of the payment card 100 in Block S210; in response to receiving the tap input, attempting wireless communication with a mobile computing device in Block S220; suppressing a payment function of the magnetic stripe emulator 140 in response to failed wireless communication with the mobile computing device in Block S230; receiving a series of inputs through the set of input regions in Block S240; authenticating the series of inputs as a passcode in Block S250; and in response to authenticating the series of inputs as the passcode, enabling the payment function of the magnetic stripe emulator 140 in Block S260.

Generally, second method S200 can be implemented through the payment card 100 described above as a security measure to prevent fraudulent use of the payment card 100. As described above, the payment card 100 can be paired with a mobile computing device, and because a verified user may carry both the payment card 100 and the mobile computing device but a fraudulent user may only have access to the payment card 100, once activated, the payment can attempt to communicate with the paired mobile computing device to authenticate use of the payment card 100. However, if the payment card 100 fails to establish a connection with the mobile computing device, the payment card 100 can implement second method S200 to receive a passcode and authenticate use of the payment card 100.

Block S210 of second method S200 recites receiving a tap input on a surface of the payment card 100. As described above, the processor 160 of the payment card 100 can implement Block S210 by receiving a voltage spike from a transducer (e.g., a piezoelectric transducer) in response to an impulse on the payment card 100 that deforms the sheet 110 of the payment card 100 and thus the transducer 150. The 'tap' or impulse can thus transition the payment card 100 to an active setting. However, Block S210 can handle a tap or impulse on the payment card 100 in any other suitable way.

Block S220 of second method S200 recites, in response to receiving the tap input, attempting wireless communication with a mobile computing device. As described above, the processor 160 and the wireless communication module 120 of the payment card 100 can cooperate to detect a paired mobile computing device. Once the mobile computing device is detected, the processor 160 can attempt to establish a wireless connection with the mobile computing device by transmitting an inquiry for the mobile computing device paired through the wireless communication module 120. Block S220 can make a predefined number of attempts to connect to the mobile computing device, such as two or five attempts, prior to switching to an idle setting and transitioning to Block S230. However, Block S220 can attempt communication with the paired mobile computing device in any other suitable way.

Block S230 of second method S200 recites suppressing a payment function of the magnetic stripe emulator 140 in response to failed wireless communication with the mobile computing device. Generally, Block S230 functions to block the magnetic stripe emulator 140 of the payment card 100 from implementing a magnetic stripe sequence of a payment method, as described above. For example, Block S230 can maintain a coil of the magnetic stripe emulator 140 in an unpowered setting. In one implementation, Block S230 suppresses the payment function of the magnetic stripe emulator 140 in response to a predefined number of failed attempts to pair with the mobile computing device that includes a unique wireless communication address, as described above.

Alternatively, Block S230 can suppress the payment function of the magnetic stripe emulator by communicating a 'void payment' command to a payment processing company that handles payment transactions through plastic banking cards. For example, Block S230 can establish a wireless Internet connection (e.g., via a Bluetooth connection with an external Internet-enabled electronic device) and transmit the 'void payment' command to a server hosted by the payment processing company such that the payment processing company can void a transaction attempted with the banking card 1000. However, Block S230 can function in any other way to withdraw or suppress a payment function of the payment card 100.

Block S240 of second method S200 recites receiving a series of inputs through the set of input regions, and Block S250 of second method S200 recites authenticating the series of inputs as a passcode. Generally, Block S240 captures a set of inputs, such as four discrete inputs, across the input regions of the payment card 100, and Block S250 compares the set of inputs to a stored passcode to authenticate use of the payment card 100 if authentication through a connection with the paired mobile computing device fails. As described above, a user can set a passcode to unlock the payment card 100 into an interface with the native application executing on the mobile computing device, the mobile computing device can transmit the passcode to the payment card 100, and the payment card 100 can store the passcode in memory. Once Block S240 captures the set of inputs entered by the user, Block S250 can match a sequence of the set of inputs with a stored sequence of inputs defining the passcode to authenticate use of the payment card 100. However, Block S240 and Block S250 can function in any other way to capture and authenticate a series of inputs as a valid passcode.

Block S260 of second method S200 recites, in response to authenticating the series of inputs as the passcode, enabling the payment function of the magnetic stripe emulator 1400. In one implementation, the processor 160 implements Block S250 to verify a passcode entered by a user, and the processor 160 subsequently implements Block S260 to power the magnetic stripe emulator 140 according to a default or selected payment method when the payment card 100 is passed through a magnetic stripe reader (shown in FIG. 5).

Figure 10:
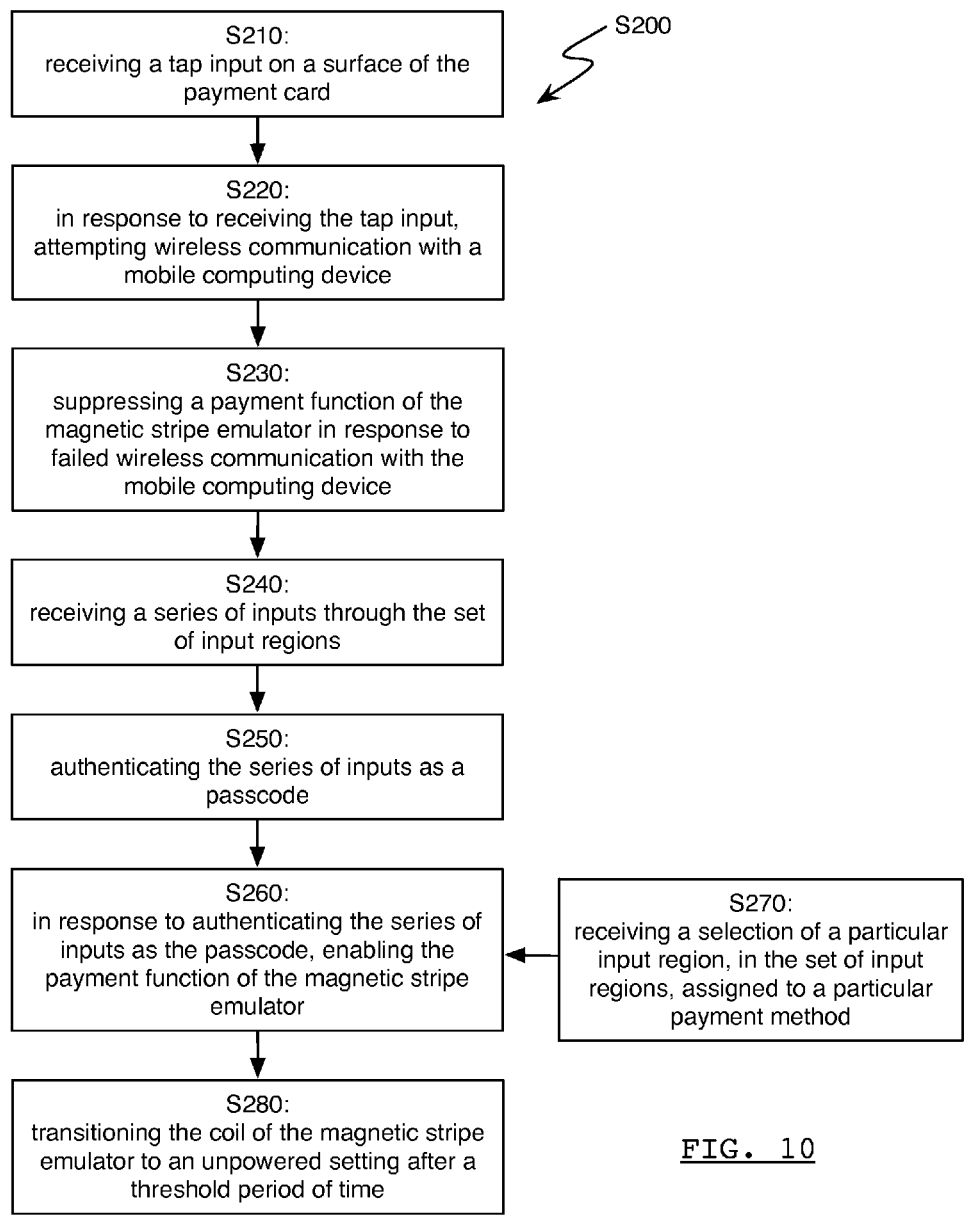
FIG. 10 is a flowchart representation of a variation of the second method.

As shown in FIG. 10, one variation of second method S200 includes Block S270, which recites receiving a selection of a particular input region, in the set of input regions, assigned to a particular payment method. Generally, Block S270 functions to capture user selection of a particular payment method, from a set of payment methods stored on the payment card 100, through one or more input regions on the payment card 100. However, Block S270 can function in any other way to receive a payment method selection from a user.

In response to receiving a payment method selection from a user, Block S260 can enable the payment function of the magnetic stripe emulator 140 by powering a coil of the magnetic stripe emulator 140 according to a magnetic sequence command associated with the particular payment method, as described above. For example, the processor 160 can implement Block S260 by outputting a control signal to the coil driver circuit 142, which can generate magnetic polarity changes corresponding to the magnetic stripe sequence of the selected payment method, as shown in FIG. 11. However, Block S260 and Block S270 can function in any other way to receive and to implement a payment method selection entered by a user.

As shown in FIG. 10, one variation of second method S200 further includes Block S280, which recites transitioning the coil of the magnetic stripe emulator 140 to an unpowered setting after a threshold period of time. Generally, Block S280 functions to transition the payment card 100 to an inactive state in which the payment card 100 can not be used to provide payment information. In one implementation and as described above, the processor 160 can set a payment timer once payment through the payment card 100 is authenticated, once a payment method is selected by a user, or once the payment card 100 is swept through a magnetic stripe reader during a transaction, etc. In this variation, the processor 160 can maintain payment functionality of the payment card 100 until expiration of the timer, at which point the processor 160 implements Block S280 to withdraw the payment function of the payment card 100 and transition the payment card 100 to the passive setting. However, Block S280 can function in any other way to shutdown the payment card 100 after a threshold period of time or in response to any other time, timer, or trigger.

4. Third Method

Figure 12:
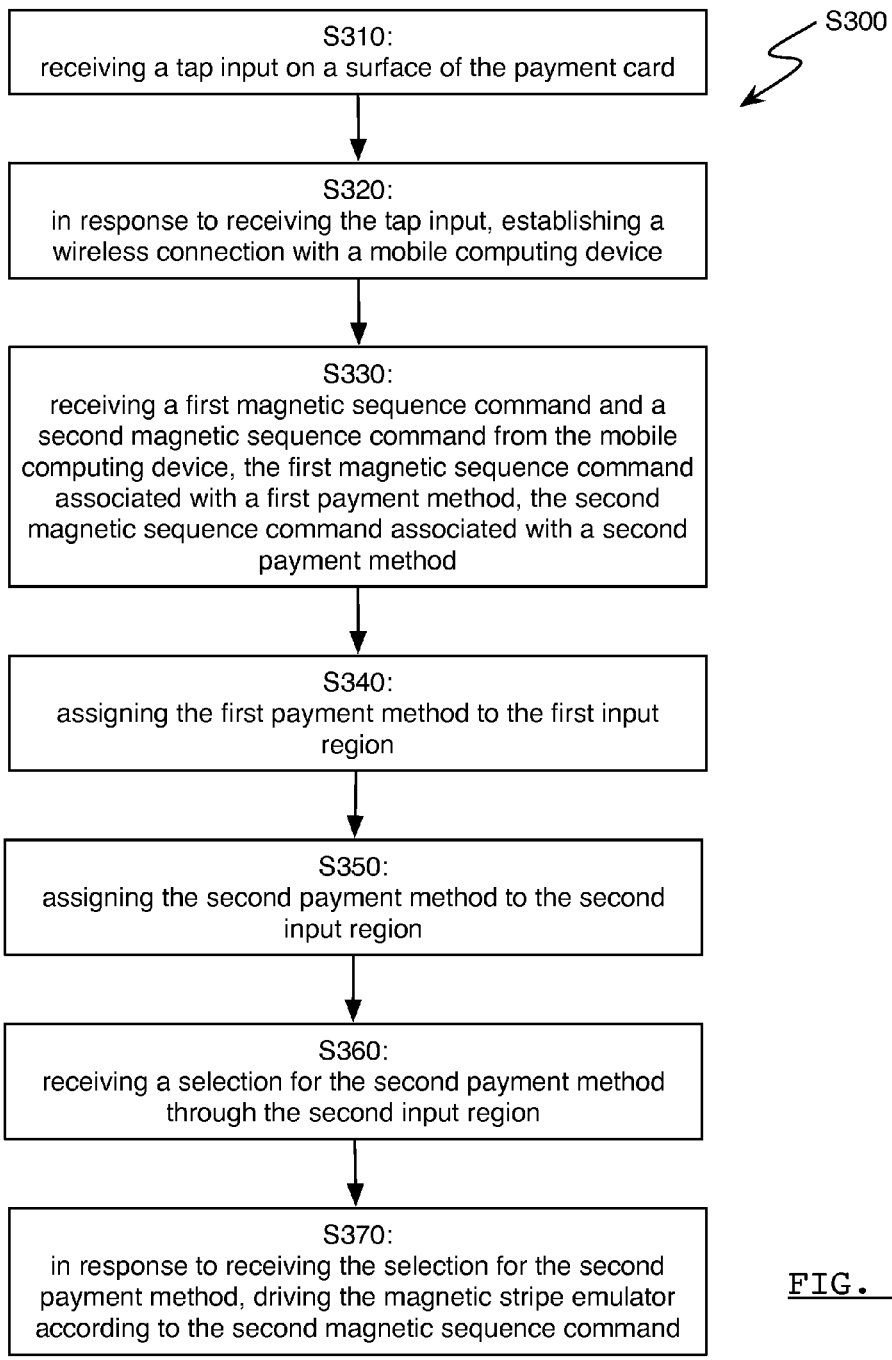
FIG. 12 is a flowchart representation of a third method.
Figure 13:
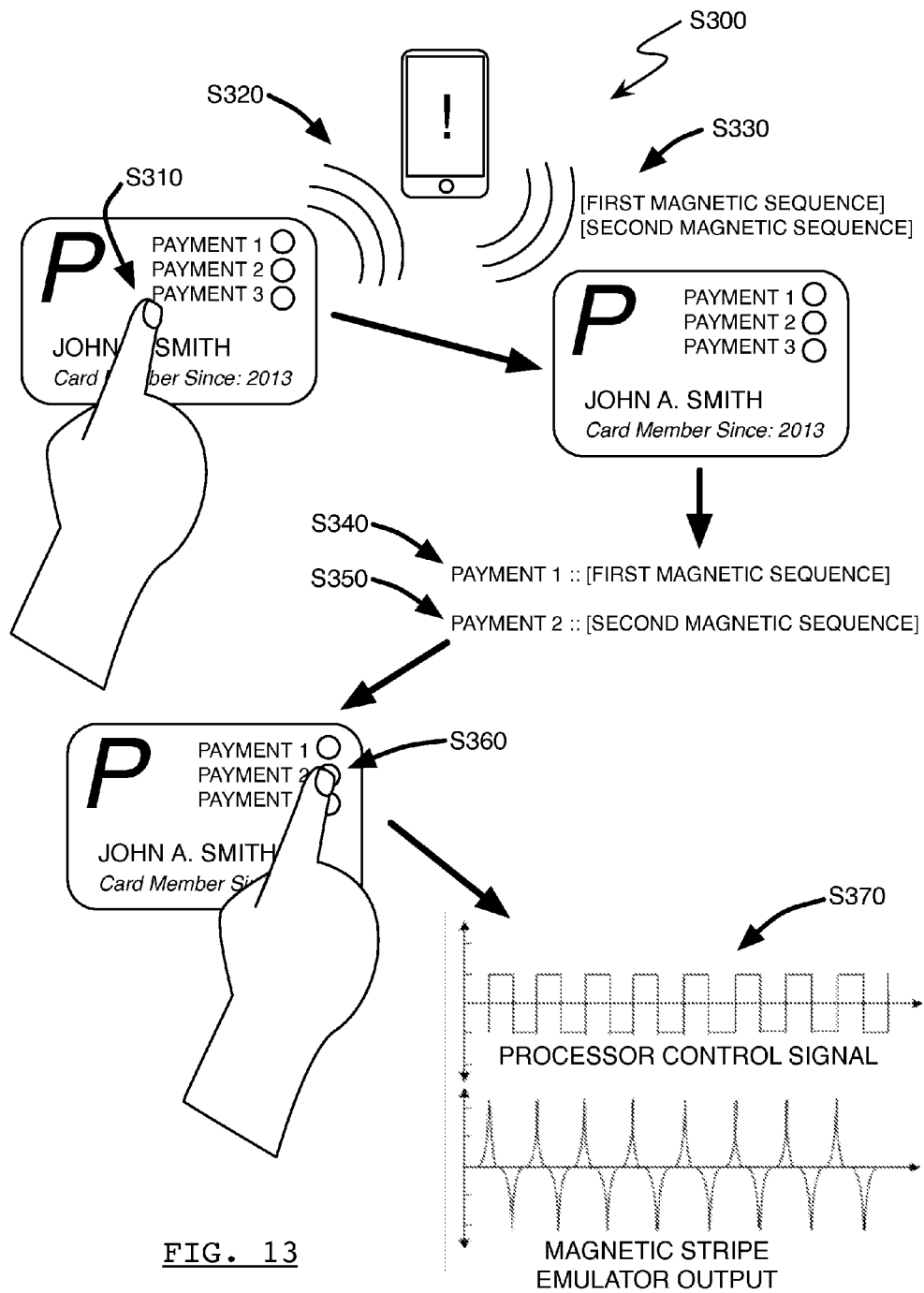
FIG. 13 is a flowchart representation of a variation of the third method.

As shown in FIGS. 12 and 13, third method S300 for controlling a payment card including a magnetic stripe emulator, a first input region, and a second input region includes: receiving a tap input on a surface of the payment card 100 in Block S310; in response to receiving the tap input, establishing a wireless connection with a mobile computing device in Block S320; receiving a first magnetic sequence command and a second magnetic sequence command from the mobile computing device in Block S330, the first magnetic sequence command associated with a first payment method, the second magnetic sequence command associated with a second payment method; assigning the first payment method to the first input region 131 in Block S340; assigning the second payment method to the second input region 132 in Block S350; receiving a selection for the second payment method through the second input region 132 in Block S360; and, in response to receiving the selection for the second payment method, driving the magnetic stripe emulator 140 according to the second magnetic sequence command in Block S370.

Generally, third method S300 can be implemented through the payment card 100 described above as a security measure to prevent fraudulent use of the payment card 100. As described above, the payment card 100 can be paired with a mobile computing device, and because a verified user may carry both the payment card 100 and the mobile computing device but a fraudulent user may only have access to the payment card 100, once activated, the payment can implement third method S300 to establish a wireless connection with the paired mobile computing device, thereby authorizing use of the payment card 100 for a subsequent payment.

Block S310 of third method S300 recites receiving a tap input on a surface of the payment card 100. Generally, Block S310 can function as Block S210 described above to transition from an inactive (i.e., passive) setting to an active setting in which the magnetic stripe emulator 140 of the payment card 100 outputs a series of bits magnetically to mimic a static magnetic stripe of a plastic bank card. For example, the processor 160 can implement Block S310 to transition from a passive mode to an active mode in response to a voltage output from the transducer 150 arranged within the payment card 100.

Block S320 of third method S300 recites, in response to receiving the tap input, establishing a wireless connection with a mobile computing device. Generally, Block S320 functions similar to Block S220 described above to detect and identify a paired mobile computing device. However, if Block S320 detects the paired mobile computing device, Block S320 can further establish the wireless connection with the mobile computing device. For example, Block S320 can transmit an inquiry for the mobile computing device and can pair the payment card 100 to the mobile computing device over the wireless connection, as shown in FIG. 13. However, Block S320 can function in any other way to communicate wirelessly with the paired mobile computing device.

Block S330 of third method S300 recites receiving a first magnetic sequence command and a second magnetic sequence command from the mobile computing device, the first magnetic sequence command associated with a first payment method, the second magnetic sequence command associated with a second payment method. In one implementation described above in which the payment card 100 and the mobile computing device establish a radio-frequency-based wireless connection, Block S330 can receive magnetic sequence commands for the set of payment methods though radio communications. In another implementation described above, the mobile computing device can output a series of optical signals (e.g., black and white or high and low light pulses) in the direction of the payment card 100, and the payment card 100 can implement Block S330 to receive and decode the optical signals into magnetic sequence commands for the set of payment methods. For example, Block S330 can receive the optical signals through a photodiode or through a photoresistor. Similarly, in the implementation described above in which the mobile computing device outputs a series of audio signals (e.g., from a speaker or audio driver), the payment card 100 can impellent Block S330 to receive and decode the audio signals into magnetic sequence commands for the set of payment methods. For example, Block S330 can record a series of audio pulses through a transducer arranged within the payment card 100 and can correlate the first magnetic sequence command from the series of audio pulses.

As described above, Block S330 can also receive a ranking for the payment methods, payment method assignments for the input regions, or any other suitable or relevant information pertaining to the payment methods. Block S330 can also receive encrypted payment method data, and Block S330 can further function to decrypt the received data. However, Block S330 can function in any other way to receive and/or process information for one or more payment methods.

Block S340 of third method S300 recites assigning the first payment method to a first input region in the set of input regions. Similarly, Block S350 of third method S300 recites assigning the second payment method to a second input region in the set of input regions. Generally, Block S340 and Block S350 function to assign one input region to one payment method such that selection of a particular input region triggers the payment card 100 to emulate the corresponding payment method (i.e., a magnetic stripe of a corresponding plastic bank card). Block S340 and Block S350 can also assign a set of input regions to one payment method to enable selection of more payment methods than number of input regions on the card.

In one implementation, Block S340 stores the first magnetic sequence command of the first payment method in a stack in computer memory and assigns an address of the first magnetic sequence command to the first input region 131. Similarly in this implementation, Block S350 stores the second magnetic sequence command of the second payment method in a stack in computer memory and assigns an address of the second magnetic sequence command to the second input region 132. However, Block S340 and Block S350 can store and assign magnetic sequence commands for various payment methods in any other suitable way.

Block S340 and Block S350 can assigned each magnetic sequence command to an input region in order that each is received. Alternatively, Block S340 and Block S350 can assign the payment methods according to a payment method rank received from the mobile computing device, as described above. Furthermore, Block S340 can set the first payment method as a default payment method, as described above, such that the payment card 100 defaults to emulating the first payment method when a payment is attempted through the card if a user fails to select an input region corresponding to another payment method. However, Block S340 and Block S350 can selectively assign each payment method to one or more input regions in any other way or according to any other schema.

Block S360 of third method S300 recites receiving a selection for the second payment method through the second input region 132. Generally, Block S360 functions to receive an input through a particular input region on the payment card 100 and to 'arm' the payment card 100 to implement the magnetic sequence command of the particular payment method. In one example, Block S360 receives an input on the surface of the payment card 100 proximal the second input region 132 that includes a capacitive touch sensor and switches from a default payment mode specifying the first payment method to a manual payment selection mode that specifies the second payment method.

In one implementation in which Block S240 and Block S250 store the first and second magnetic sequence commands in a stack in computer memory and assign addresses of the magnetic sequence command to respective input regions, Block S360 can set a pointer within the stack to a particular address in response to a selection on a corresponding input region. However, Block S360 can function in any other way to receive and implement selection of a payment method through a corresponding input region on the payment card 1000.

Block S370 of third method S300 recites, in response to receiving the selection for the second payment method, driving the magnetic stripe emulator 140 according to the second magnetic sequence command. Generally, Block S370 functions to implement a magnetic sequence command of a selected or default payment method through the magnetic stripe emulator 140 of the payment card 100 to mimic a plastic bank card when use of the payment card 100 is attempted.

As described above, Block S370 can detect a magnetic stripe reader and power one or more coils of the magnetic stripe emulator 140 according to the default or selected magnetic sequence command according to a speed and/or position of the magnetic stripe emulator 140 relative to a read head of the magnetic stripe reader. Block S370 can therefore function to magnetically couple the magnetic stripe emulator 140 to the magnetic stripe reader and control a magnetic polarity of the magnetic stripe emulator 140 accordingly. However, Block S370 can function in any other way to control the magnetic stripe emulator 140 of the payment card 100, thereby enabling payment with a selected payment method through the payment card 100.

5. Fourth Method

Figure 14:
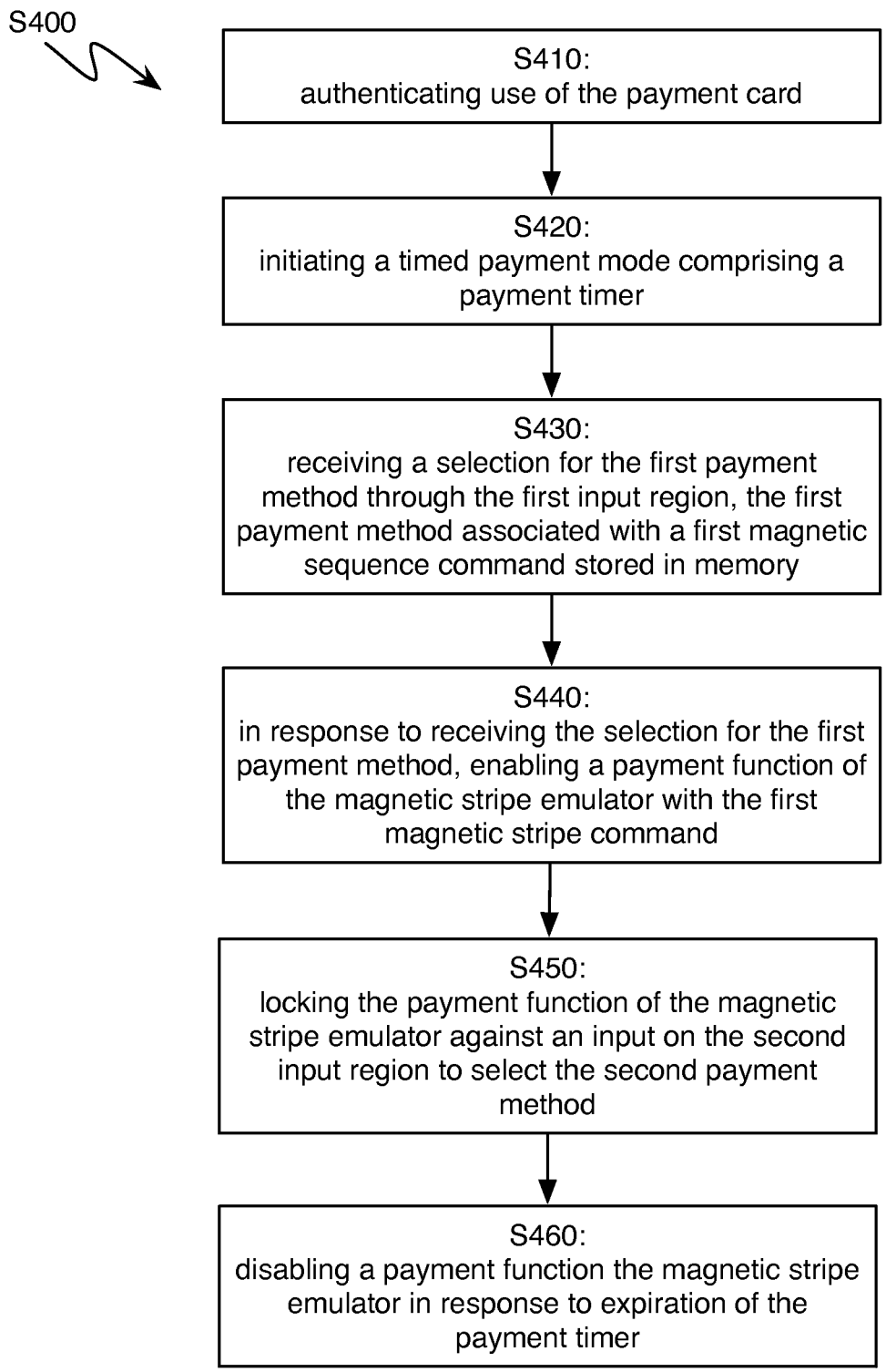
FIG. 14 is a flowchart representation of a fourth method.
Figure 15:
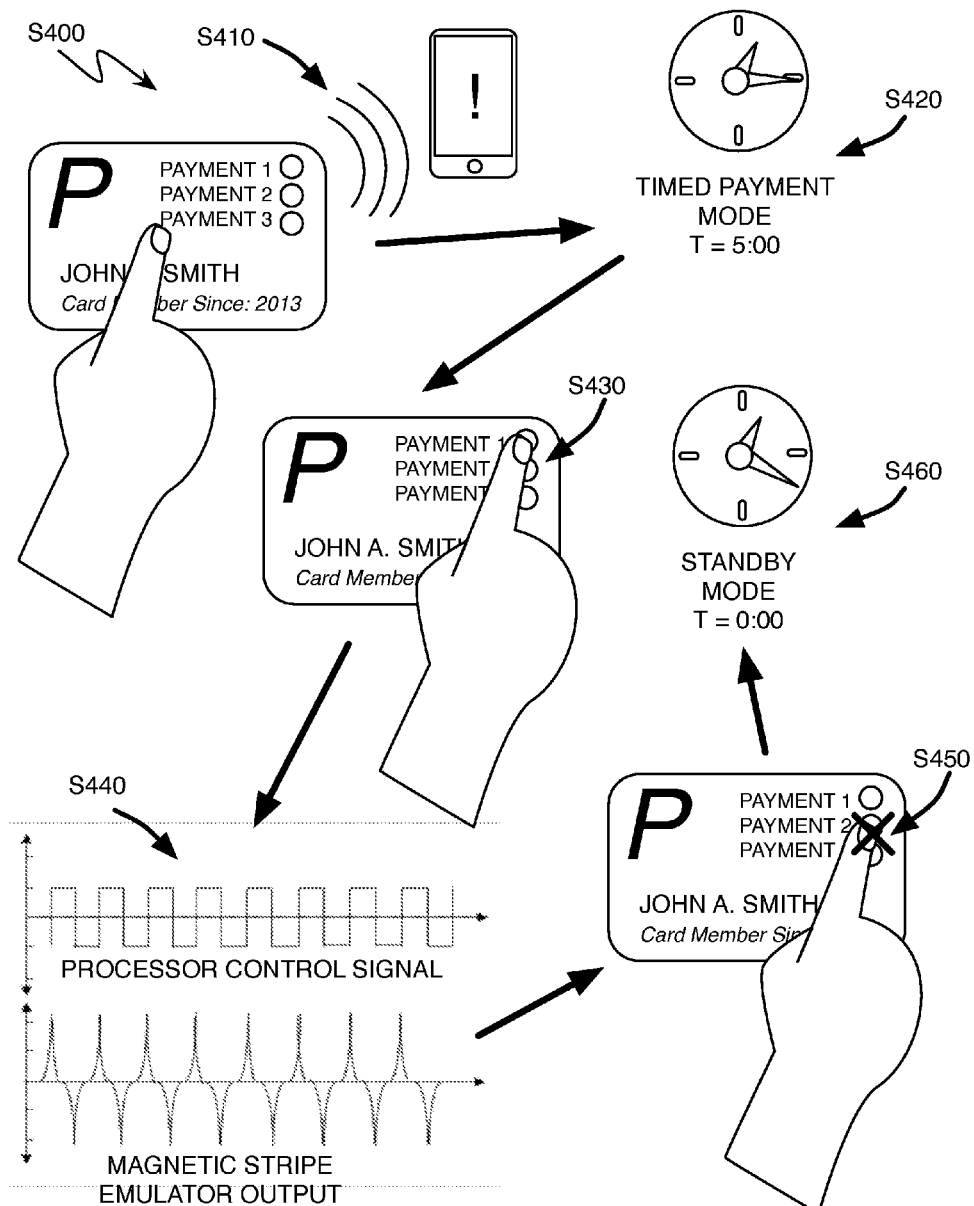
FIG. 15 is a flowchart representation of a variation of the fourth method.

As shown in FIGS. 14 and 15, fourth method S400 for controlling a payment card including a magnetic stripe emulator, a first input region assigned a first payment method, and a second input region assigned a second payment method includes: authorizing use of the payment card 100 in Block S410; initiating a timed payment mode comprising a payment timer in Block S420; receiving a selection for the first payment method through the first input region 131 in Block S430, the first payment method associated with a first magnetic sequence command stored in memory; in response to receiving the selection for the first payment method, enabling a payment function of the magnetic stripe emulator 140 with the first magnetic stripe command in Block S440; locking the payment function of the magnetic stripe emulator 140 against an input on the second input region 132 to select the second payment method in Block S450; and disabling a payment function the magnetic stripe emulator 140 in response to expiration of the payment timer in Block S460.

Generally, fourth method S400 can be implemented through the payment card 100 described above to "lock" a selected payment method to the card for a specified period of time. Fourth method S400 can therefore be useful during periods in which an owner of the payment card 100 'hands off' the payment card 100 to another individual to make a payment. For example, fourth method S400 can be implemented through the payment card 100 when a user (i.e., the owner of the payment card 100) hands the payment card 100 to a waiter following a meal at a restaurant. In this example, fourth method S400 can lock a particular payment method selected by the user to avoid incidental selection of an alternative payment method when the waiter handles the payment card 100.

Block S410 of fourth method S400 recites authorizing use of the payment card 1000. In one implementation, Block S410 can implement Blocks of second method S200 described above by establishing a wireless connection with a paired mobile computing device and authorizing use of the payment card 100 based on the wireless connection. For example, Block S410 can receive a tap input on a surface of the payment card 100, transmit an inquiry for a mobile computing device paired to the payment card 100, and establish a wireless connection with a mobile computing device to authenticate use of the payment card 100. Additionally or alternatively, Block S410 can implement Blocks of third method S300 described above by receiving a series of inputs on the input regions of the card and matching the series of inputs to a passcode to authenticate use of the payment card 100. For example, Block S410 can receive a tap input on a surface of the payment card 100, receive a series of inputs through the first input region 131 and the second input region 132, and authenticate the series of inputs as a valid passcode to enable use of the payment card 100. As described above, Block S410 can control a visual indicator within the payment card 100 (e.g., an LED) or displayed on the mobile computing device through the native application to indicate to a user than that payment card has been authenticated. However, Block S410 can function in any other way to authenticate use of the payment card 100 in a subsequent transaction.

Block S420 of fourth method S400 recites initiating a timed payment mode, as shown in FIG. 15. Generally, Block S420 functions to transition the payment card 100 into the timed payment mode in which a selected payment method is "locked in" (i.e., cannot be changed) for a period of time. In one implementation, the native application executing on the mobile computing device receives an input from a user specifying the timed payment mode, and Block S420 receives a corresponding timed payment mode request from the mobile computing device. Thus, in this implementation, the mobile computing device and/or the native application can function as an external control unit for the payment card 1000.

In another implementation, Block S420 receives a series of inputs through the first input region 131 and the second input region 132 and identifies the series of inputs as a timed payment mode request. In this implementation, Block S410 can first receive passcode enter by a user through the input regions to authenticate use of the payment card 100 or authenticate use of the payment card 100 by establishing a wireless connection with the mobile computing device, and Block S420 can subsequently receive a second series of inputs corresponding to a timed payment request. Alternatively, Block S410 and Block S420 can cooperate to receive a single passcode that both authenticates use of the payment card 100 and selects the timed payment mode as a current operating mode of the payment card 100. For example, the payment card 100 can be configured to receive a first passcode (e.g., 1212) to authenticate use of the payment card 100 through a standard operating mode in which payment methods can be selected at whim and the payment card 100 becomes inactive after a period of inactivity (e.g., one minute without a swipe through a magnetic stripe reader), and the payment card 100 can also be configured to receive a second passcode (e.g., 1122) to authenticate use of the payment card 100 through the timed payment mode in which a selected payment method is locked to the card and the payment card 100 becomes inactive after a predetermined period of time.

Block S420 can initiate the timed payment mode once a request to enter the timed payment mode is entered by a user by triggering a payment timer of a set period of time. In this implementation, Block S430 can subsequently receive a selection for a payment method, Block S440 can enable a payment function of the payment card 100 with the selected payment method, and Block S460 can withdraw the payment function of the payment card 100 once the payment timer expires (i.e., after the set period of time transpires).

Alternatively, Block S420 can initiate the timed payment mode once Block S430 receives a selection of a payment more from a user. In this implementation, Block S430 can receive a payment method selection, Block S420 can initiate the payment timer, Block S440 can enable the payment function of the payment card 100 with the selected payment method, and Block S460 can subsequently withdraw the payment function of the payment card 100 once the payment timer expires. In this implementation, Block S420 can initiate the timed payment mode by setting the payment timer, and Block S430 can trigger the payment timer once a selection for a payment method is entered.

Block S420 can specify a default timer length for the payment timer, such as five minutes. Block S420 can also sync with the mobile computing device and retrieve a suggested timer length from the mobile computing device. For example, the mobile computing device can estimate an optimum timer length based on a time of day, a location of the user (e.g., determined by a global positioning system sensor in the mobile computing device), a preference of the user, etc., and Block S420 can retrieve the estimated optimum timer length from the mobile computing device. Alternatively, Block S420 can receive a user input to control the length of the payment timer. For example, Block S420 can receive a user input requesting the timed payment mode, control a visual indicator within the payment card 100 (e.g., an LED) or displayed on the mobile computing device through the native application to provide visual feedback that the payment card 100 is in the timed payment mode, receive a subsequent input through the payment card 100 or through the mobile computing device specifying a length of the time, and then set the length of the timer according to the user input. However, Block S4200 can function in any other way to initiate the timed payment mode.

Block S430 of fourth method S400 recites receiving a selection for the first payment method through the first input region 131, the first payment method associated with a first magnetic sequence command stored in memory. Generally, Block S430 functions like Block S360 described above to receive an input on an input region and to correlate the input with a selection for a payment method assigned to the input region. As described above, Block S430 can receive a selection for a particular payment method through a physical input region arranged on the payment card 100 and/or through a virtual input region displayed on a touchscreen or other display of a paired mobile computing device. However, Block S430 can function in any other way to capture a user selection for a payment method. As described above, Block S430 can also function to trigger the payment timer once a user selection for a payment method is captured. Block S430 can also provide visual feedback of the payment selection through the payment card 100 (e.g., by controlling an LED within the payment card 100) or through the native interface executing on the mobile computing device.

Block S440 of fourth method S400 recites, in response to the selection for the first payment method, enabling a payment function of the magnetic stripe emulator 140 through implementation of the first magnetic stripe command. Generally, Block S440 functions like Block S260 and Block S370 to drive the magnetic stripe emulator 140 according to a magnetic sequence command corresponding to the selected and "locked" payment method. For example and as described above, Block S440 can detect a magnetic stripe reader and power the magnetic stripe emulator 140 according to the first magnetic sequence command and a position and/or speed of the magnetic stripe emulator 140 relative to a read head of a magnetic stripe reader. Block S440 can also provide visual feedback through the payment card 100 or through the mobile computing device that the payment function of the payment card 100 is active. However, Block S440 can function in any other way to enable a payment function of the payment card 100 through a magnetic sequence command corresponding to a selected payment method.

Block S450 of fourth method S400 recites disregarding an input on the second input region 132 as a selection for the second payment method. Generally, Block S450 functions to implement a "lock" feature of fourth method S400 by ignoring additional inputs on the physical input regions of the payment card 100 or the virtual input regions displayed on a display of a mobile computing device to select (purposefully or accidentally) an alternative payment method. For example, Block S450 can lock the magnetic stripe emulator 140 in a first payment method payment mode in response to the selection of the first payment method and prior to expiration of the payment timer such that the magnetic stripe emulator 140 cannot be switched from the first payment method payment mode to another payment method payment mode until the payment timer expires.

In one implementation, the processor 160 of the payment card 100 can implement Block S450 by cutting power to a touch sensor, mechanical switch, or other sensor adjacent the set of input regions to withdraw input sensing capabilities of the payment card 100 once Block S430 receives a selection for payment method. In another implementation, the processor 160 can implement Block S450 by actively ignoring (i.e., not responding) to input signals received from the set of input regions once Block S430 receives a selection for payment method. However, Block S450 can be implemented in any other way to actively or passively disregard an input on an input region of the payment card 100 once a payment method is selected in Block S430.

Block S460 of fourth method S400 recites disabling a payment function of the magnetic stripe emulator 140 after a specified period of time. Generally, Block S460 disables the payment function of the payment card 100 once the payment timer expires and/or once the payment card 100 has implemented the selected payment method in a transaction. For example, Block S420 can set the payment timer at five minutes from selection of a payment method, Block S430 can initiate the timer when the user selects a payment method, and Block S460 can cancel or stop the payment function of the payment card 100 when the timer expires.

Block S460 can also provide visual feedback that the timer is approaching expiration. For example, Block S460 can blink an LED within the payment card 100 during the last thirty seconds on the payment timer. Block S460 can similarly blink the LED at a rate proportional to the amount of time left on the payment timer such that the LED blinks faster as the payment timer approaches expiration.

Once the timer expires, Block S460 can transition the magnetic stripe emulator 140 to a standby or default setting in which the magnetic stripe emulator 140 is unpowered in the default setting, as shown in FIG. 15. Alternatively, Block S460 can transition the payment card 100 to a passive, inactive, 'sleep,' or OFF setting. In this alternative, the payment card 100 can subsequently repeat Block S410 to enable a subsequent payment. However, Block S460 can function in any other way to disable the payment function of the payment card 100.

As described above, the foregoing methods can be implemented in cooperation with or through a payment card including a NFC tag emulator, a RFID tag emulator, and/or any other payment authorization protocol emulator in addition or as an alternative to a magnetic stripe emulator. The foregoing methods can therefore enable substantially secure consolidation of one or more plastic bank card, NFC, RFID, gift card, and/or other payment method on a single payment card.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile computing device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for controlling a payment card including a magnetic stripe emulator, a processor, and an input region, the method comprising:
    establishing a wireless connection with a mobile computing device;
    receiving, over the wireless connection, a first magnetic sequence command corresponding to a first payment method and a second magnetic sequence command corresponding to a second payment method;
    initiating a payment mode comprising a disable trigger;
    in response to selection of the first payment method through the input region, arming the processor to drive the magnetic stripe emulator according to the first magnetic sequence command in the payment mode; and
    in response to failure of a wireless connection with the mobile computing device, disabling operation of the magnetic stripe emulator.

2. The method of claim 1, wherein initiating the payment mode comprises initiating a payment timer, and wherein disabling operation of the magnetic stripe emulator comprises disabling the magnetic stripe emulator in response to expiration of the payment timer.

3. The method of claim 2, wherein initiating the payment mode comprises receiving a sequence of inputs on the input region, identifying the sequence of inputs as a timed payment mode request, receiving a location of the mobile computing device over the wireless connection, and setting the payment timer for a period of time corresponding to the timed payment mode request and based on the location of the mobile computing device.

4. The method of claim 1, further comprising, in the payment mode, detecting a read head of a magnetic stripe reader and powering a coil of the magnetic stripe emulator according to the first magnetic sequence command and a detected speed of the magnetic stripe emulator relative to the read head.

5. The method of claim 1, wherein disabling operation of the magnetic stripe emulator comprises transitioning the payment card into a standby mode, the magnetic stripe emulator unpowered in the standby setting.

6. The method of claim 1, further comprising, in the payment mode, dismissing selection of the second payment method through the input region.

7. A method for controlling a payment card including a planar sheet, a magnetic stripe emulator, a processor, and an input region, the method comprising:
    in response to receiving an input on the payment card, attempting wireless communication with a mobile computing device through a substantially unique address of the mobile computing device stored on the payment card;
    in response to failed wireless communication with the mobile computing device, restricting a payment function of the payment card;
    receiving a sequence of inputs on the input region;
    in response to authentication of the sequence of inputs as a stored passcode, enabling the payment function of the payment card; and
    arming the processor to drive the magnetic stripe emulator according to a magnetic sequence command previously loaded onto the payment card.

8. The method of claim 7, further comprising driving the magnetic stripe emulator according to the first magnetic sequence command in response to progression of the payment card through a magnetic stripe reader.

9. The method of claim 7, wherein enabling the payment function of the payment card comprises detecting a series of impulses on the payment card that deform the planar sheet and authenticating the series of impulses as the passcode.

10. The method of claim 7, wherein attempting wireless communication with the mobile computing device comprises attempting wireless communication with the mobile computing device in response to receiving a voltage output from a piezoelectric transducer arranged within the payment card.

11. The method of claim 7, wherein attempting wireless communication with the mobile computing device comprises transmitting an inquiry to a unique wireless address associated with the mobile computing device, and wherein restricting the payment function of the payment card comprises restricting the payment function of the payment card in response to a predefined number of failed attempts to establish a wireless connection with the mobile computing device.

12. The method of claim 7, wherein arming the processor to drive the magnetic stripe emulator comprises retrieving the magnetic sequence command from a ranked set of magnetic sequence commands previously received from the mobile computing device and stored on the payment card, the ranked set of magnetic sequence commands comprising the magnetic sequence command and a second magnetic sequence command corresponding to a second payment method.

13. The method of claim 12, further comprising, in response to an input on the input region, arming the processor to drive the magnetic stripe emulator according to the second magnetic sequence command.

14. A method for controlling a payment card including a planar sheet, a magnetic stripe emulator, a processor, and an input region, the method comprising:
    in response to an input on a surface of the payment card, establishing a wireless connection with a mobile computing device;
    receiving, over the wireless connection, a ranked set of magnetic sequence commands, the ranked set of magnetic sequence commands comprising a default magnetic sequence command corresponding to a default payment method and a secondary magnetic sequence command corresponding to a secondary payment method;
    in response to establishing a wireless connection within the mobile computing device, arming the processor to drive the magnetic stripe emulator according to the default magnetic sequence command;
    in response to an input on the input region, arming the processor to drive the magnetic stripe emulator according to the secondary magnetic sequence command; and
    setting a payment timer for arming the processor to drive the magnetic stripe emulator according to the secondary magnetic sequence command, the period of time based on a location of the mobile computing device and received from the mobile computing device.

15. The method of claim 14, wherein establishing the wireless connection comprises establishing the wireless connection in response to an input on the payment card that bends the sheet out of plane.

16. The method of claim 14, wherein establishing the wireless connection comprises receiving a sequence of inputs on the input region and establishing the wireless connection in response to authentication of the sequence of inputs as a stored passcode.

17. The method of claim 14, further comprising assigning the default payment method to a first input area of the input region and assigning the secondary payment method to a second input area of the input region according to a payment method rank received from the mobile computing device, wherein arming the processor to drive the magnetic stripe emulator according to the secondary magnetic sequence command comprises arming the processor to drive the magnetic stripe emulator according to the secondary magnetic sequence command in response to selection of the second input area.

18. The method of claim 14, further comprising driving the magnetic stripe emulator according to the secondary magnetic sequence command in response to progression of the payment card through a magnetic stripe reader.

19. The method of claim 14, wherein arming the processor to drive the magnetic stripe emulator according to the secondary magnetic sequence command comprises receiving a sequence of inputs on the input region and arming the processor to drive the magnetic stripe emulator according to the secondary magnetic sequence command according to a correlation between the sequence of inputs and the secondary payment method.

20. The method of claim 19, wherein receiving the sequence of inputs on the input region comprises receiving an input at a capacitive touch sensor arranged within the planar sheet.

\* \* \* \* \*